April 16, 1963 P. T. STAINFORTH ETAL 3,085,696
HANDLING OF PACKED CONTAINERS

Filed June 5, 1959 9 Sheets-Sheet 1

INVENTORS
PETER TERRICK STAINFORTH
PETER STUART WEIR
BY Cushman, Darby & Cushman
ATTORNEYS

INVENTORS
PETER TERRICK STAINFORTH
PETER STUART WEIR

BY Cushman, Darby & Cushman
ATTORNEYS

INVENTORS
PETER TERRICK STAINFORTH
PETER STUART WEIR
BY Cushman, Darby & Cushman
ATTORNEYS

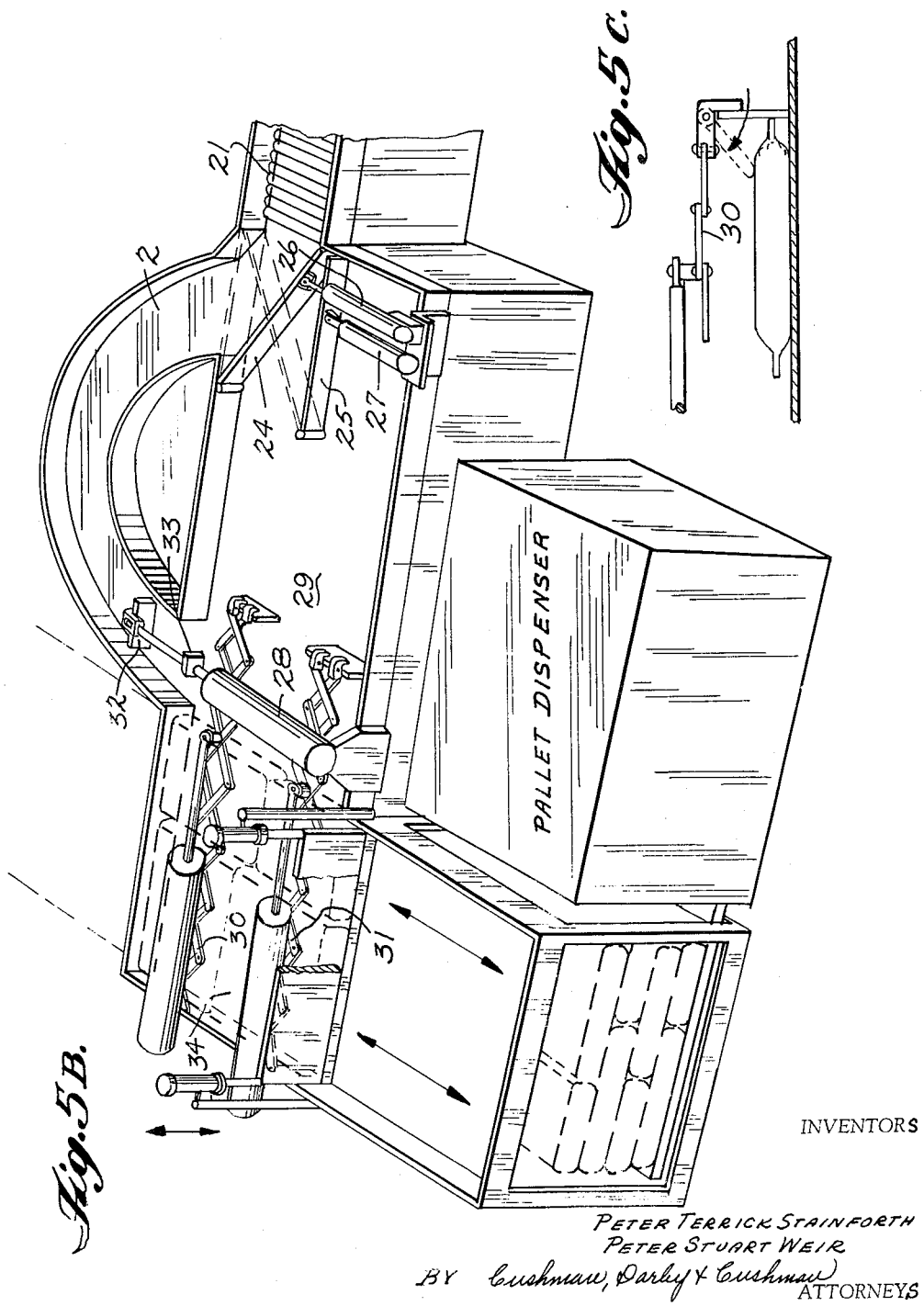

Fig. 7.

April 16, 1963  P. T. STAINFORTH ETAL  3,085,696
HANDLING OF PACKED CONTAINERS
Filed June 5, 1959  9 Sheets-Sheet 9

OVERIDING HAND
CONTROLL FOR
MOTOR N° 5.

INVENTORS
PETER TERRICK STAINFORTH
PETER STUART WEIR

BY Cushman, Darby & Cushman
ATTORNEYS

United States Patent Office 3,085,696
Patented Apr. 16, 1963

3,085,696
HANDLING OF PACKED CONTAINERS
Peter Terrick Stainforth, Knebworth, and Peter Stuart Weir, Highgate, London, England, assignors to Imperial Chemical Industries Limited, London, England, a corporation of Great Britain
Filed June 5, 1959, Ser. No. 818,384
Claims priority, application Great Britain June 6, 1958
7 Claims. (Cl. 214—6)

This invention relates to improvements in the handling of packed containers, particularly packed sacks.

In the packing and storing of large quantities of granular or powdery solid material, widespread use is made of sacks as the containers, in particular multi-ply paper sacks, and mechanical equipment to handle the sacks. The sacks are normally stacked in several layers on a pallet and the loaded pallets are conveyed and stacked one on top of the other by means of automatic handling equipment e.g. fork lift trucks. The sacks are usually stacked in layers on a pallet according to a fixed pattern so that the sacks are in effect bonded together so that there is no tendency for any one sack to become dislodged from the stack.

The actual pattern used depends upon the size of the pallet and the number of sacks that can be stacked in each layer. A convenient arrangement that is used is to stack eight layers of five 56 lb. sacks per layer. This gives a total pallet load of one ton. A pattern that is used for this arrangement is to have three sacks side by side and then have two sacks end to end along the ends of the three sacks. By rotating the pattern through 180° with each additional layer, the layers are well bonded on the pallet. Other methods of arranging the sacks are known.

Loading pallets in this way is normally done by hand, and involves considerable physical effort. It is an object of this invention to overcome the disadvantages of manual loading by providing an apparatus and method by means of which pallet loading is carried out fully automatically.

According to the present invention we provide an improved apparatus for packing containers on pallets which comprises a plate having a straight edge and being capable of providing a horizontal platform to support a single layer of containers and also being capable of movement in a horizontal direction at right angles to said straight edge, at least one container feeding means positioned to feed containers in a horizontal direction normal to said edge, at least one container feeding means positioned to feed containers in a direction parallel to said edge, and pushing or pulling means movable in at least one of the directions in which the containers are fed to position containers fed from said container feeding means on said plate, a pallet holding means, means for moving said plate so that said edge moves above a pallet on said pallet holding means from a far side to past a near side of said pallet, means for raising and lowering said pallet holding means, and a stopping means parallel to said edge and adapted to prevent horizontal movement of containers with the plate when the plate is carrying a layer of containers and is positioned over a pallet on said pallet holding means. This apparatus is well suited to fully automatic control and it is a further feature of this invention for our apparatus to include automatic controlling means acting in combination with said feeding and pushing or pulling means to supply containers to said plate in a sequence of one of at least two packing combinations of single layers of containers and then in another of said packing combinations, means for controlling the movement of said plate, said pallet holding means to cause said plate when a single layer of containers has been fed thereto to be held above said pallet holding means with the load of said pallet holding means immediately below said plate and said stopping means in a position remote from said edge to prevent movement of said layer of containers with further movement of said plate, to then cause said plate to be withdrawn from above said pallet holding means, and then to lower said pallet holding means ready to take a further layer of containers and to repeat this cycle of operations with the said sequence of layers of containers in at least two packing combinations.

Our invention also includes the use of our apparatus to packing containers on pallets according to a pre-determined pattern.

It will be appreciated that our apparatus can be used to stack containers of many different kinds and sizes on to pallets. The containers may be for example paper sacks containing powdery or granular material, cartons, or crates holding bottles.

To enable our invention to be clearly understood the following detailed embodiment is described with reference to the attached drawings in which.

Figure 4A:
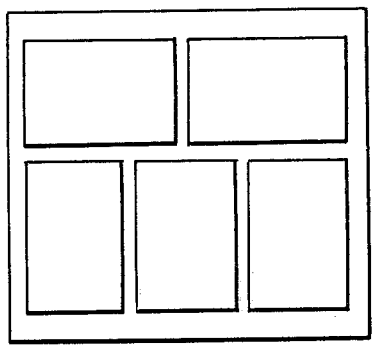
Figure 4B:
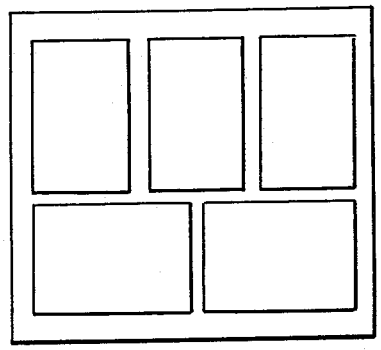

FIGURES 4(a) and 4(b) illustrate the arrangements in which alternate layers of sacks are stacked on the pallet.

Figure 5:
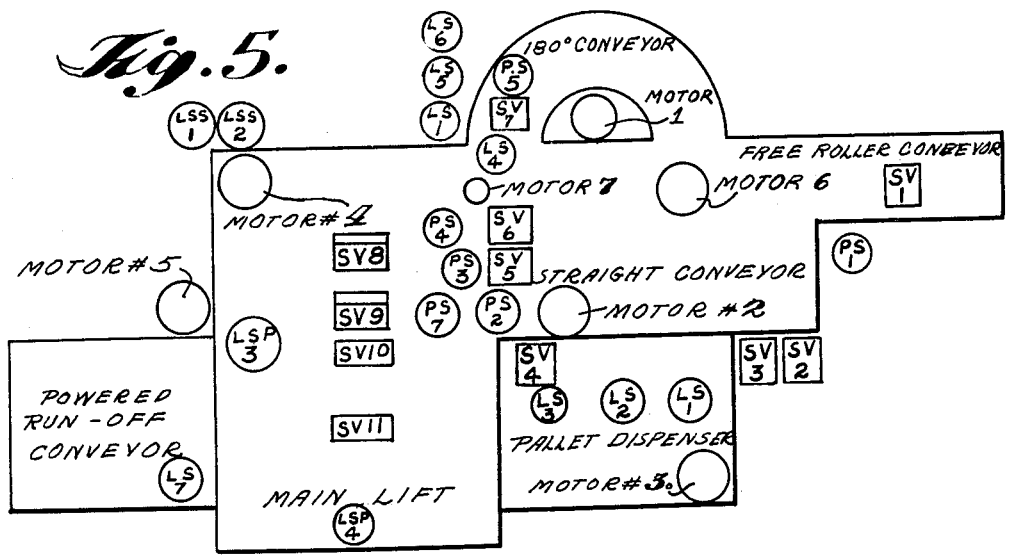
Figure 5A:
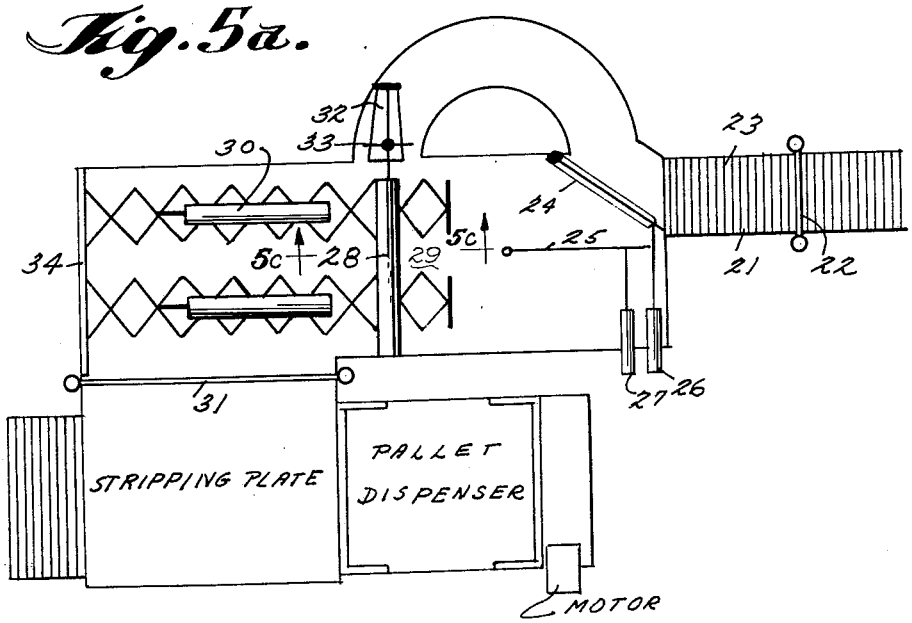
Figure 6:
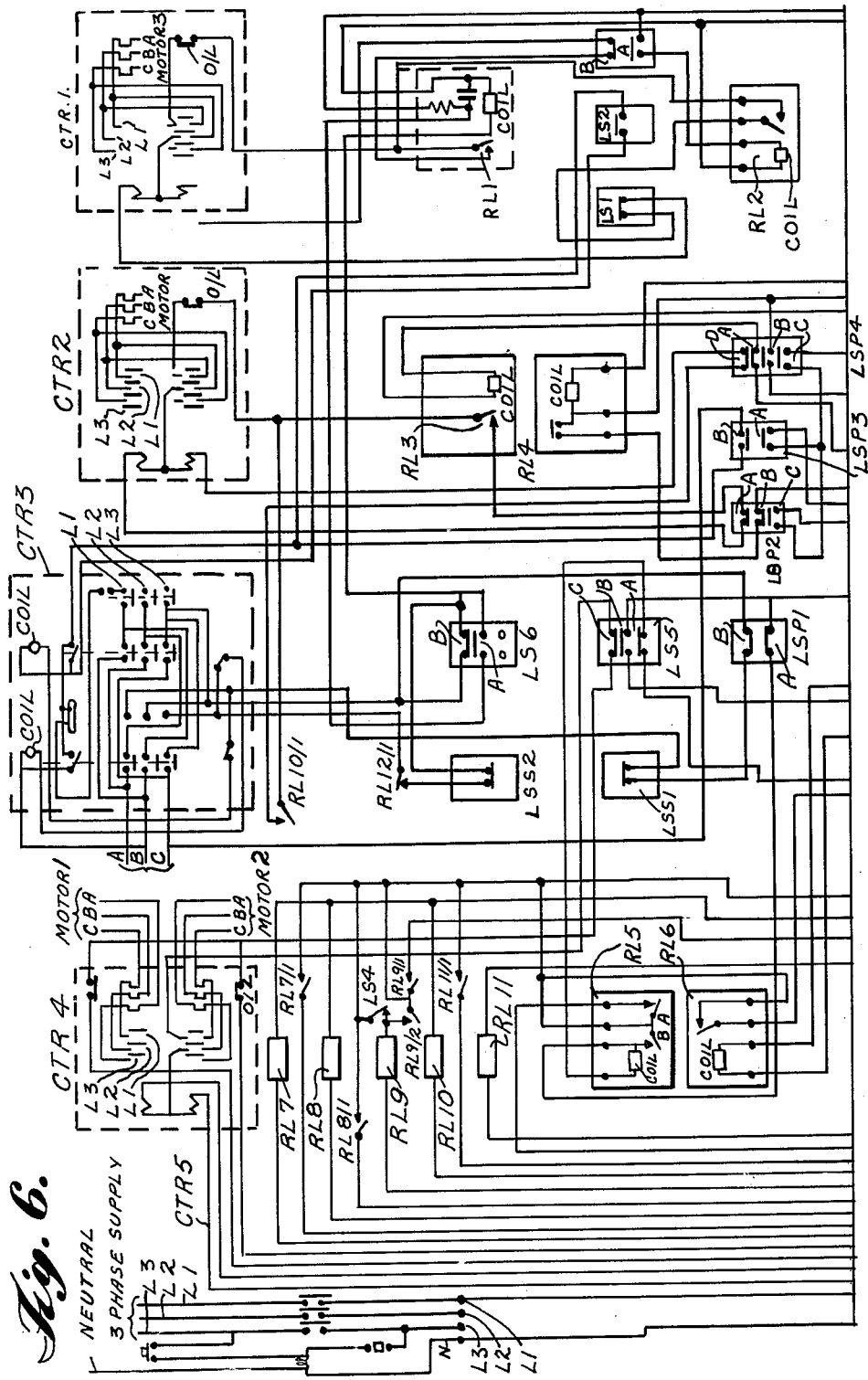
Figure 6A:
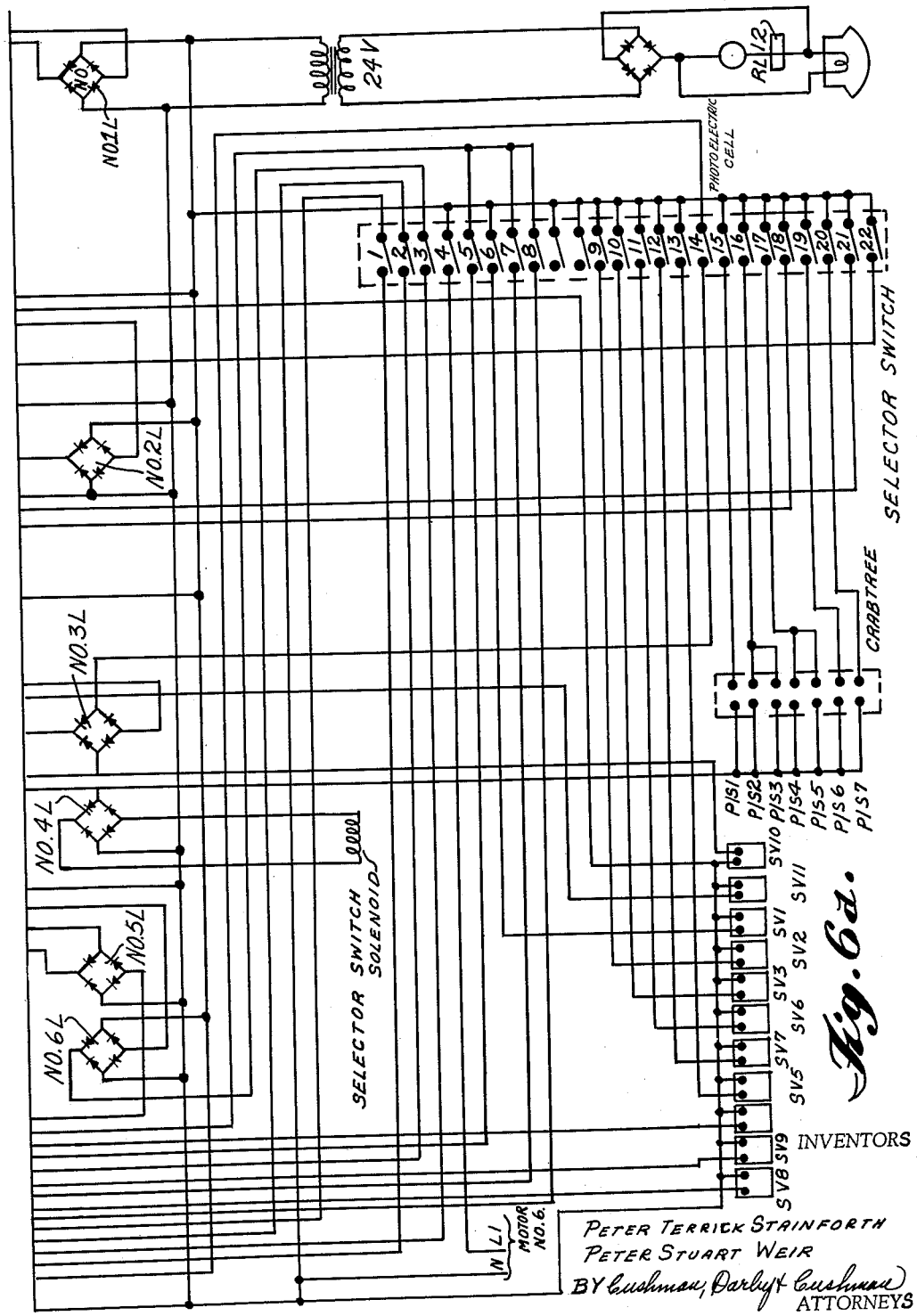
Figure 6B:
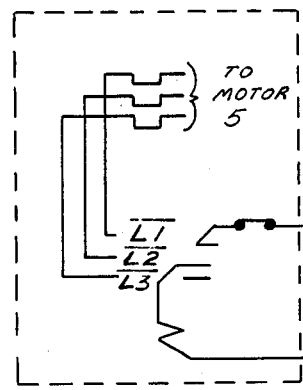

FIGURE 5 is a diagrammatic plan view of a modified embodiment of this invention, showing the location of the various control mechanisms;

FIGURE 5(a) is a plan view, similar to that shown in FIGURE 5, with the structural elements constructed and arranged according to this embodiment of the invention;

FIGURE 5(b) is a perspective view of the assembly shown in FIGURE 5(a);

FIGURE 5(c) is a detail elevation view of a one-way urging rod, taken substantially along line 5(c)—5(c) in FIGURE 5(a);

FIGURES 6 and 6(a), taken together, show diagrammatically the electrical circuit for this embodiment of the invention;

FIGURE 6(b) is a detail view of a portion of the electrical circuit;

Figure 7:
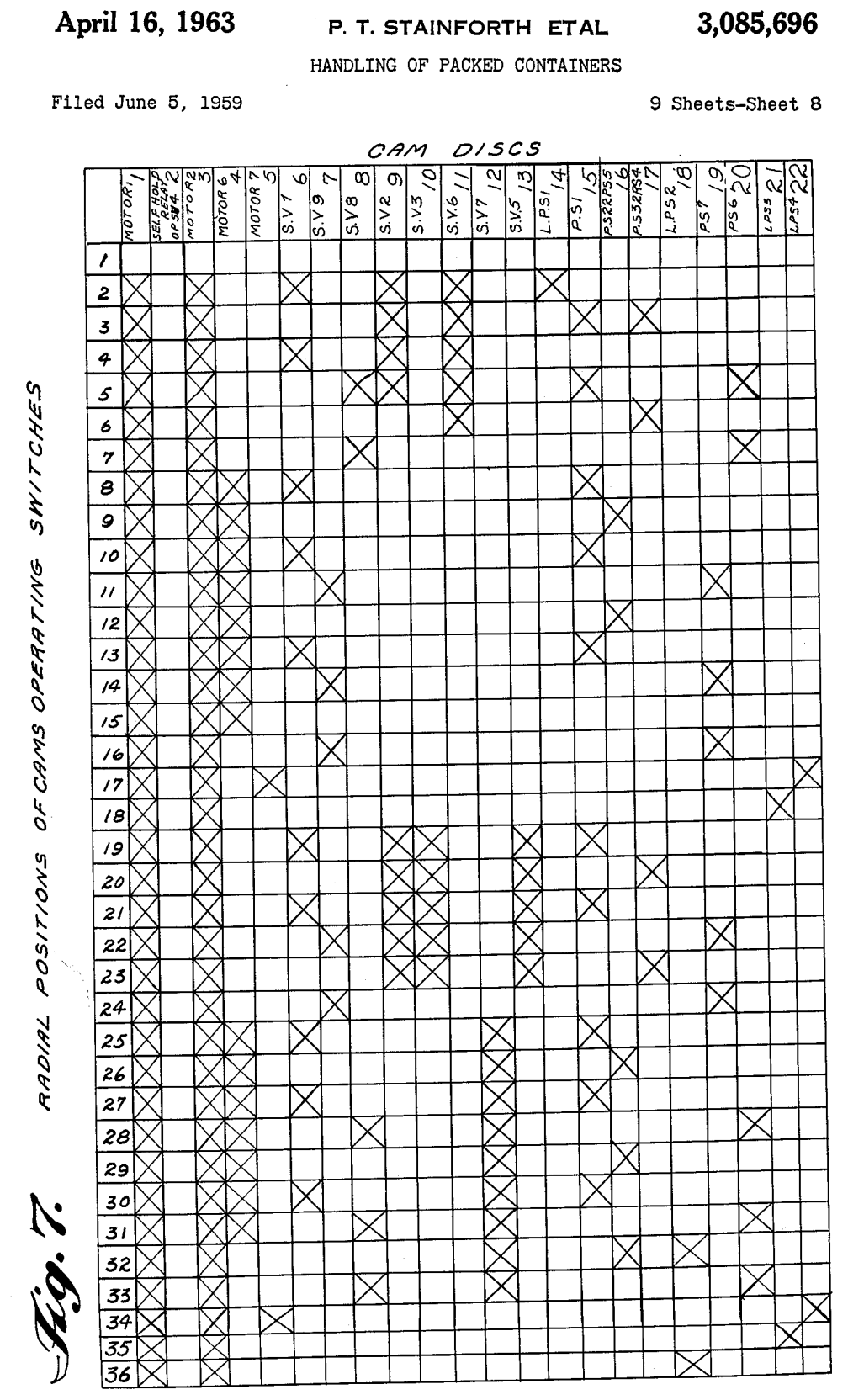

FIGURE 7 is a tabular showing of the controls for the electric circuit;

FIGURES 8(a), 8(b), 8(c), and 8(d) illustrate an embodiment of the apparatus in which the stacking of two separate kinds of packed materials is carried out by one apparatus.

In the following description of the embodiment illustrated, filled sacks that are fed so that they lie side by side on the pallet are referred to as "headers" and filled sacks that are fed so that they lie end to end are referred to as "stretchers." In FIGURES 4(a) and 4(b) three headers are shown lying side by side, and two stretchers end to end.

General Description of Apparatus

The conveyor 1 is the marshalling conveyor and feeds all the filled sacks either to the header conveyor 2 or to the stretcher conveyor 3. The stretcher conveyor 3 is divided in its path into the two sections 4 and 5. Between the marshalling conveyor and the header and the stretcher conveyors 2 and 3 is a gate 6 which is hinged so that it can be moved to close conveyor 3 and leave conveyor 2 open to the marshalling conveyor, or to close conveyor 2 and leave conveyor 3 open to the marshalling conveyor. The movement of the gate is controlled by an air cylinder 10. The operation of the gate 6 is controlled by an electric relay, which in turn is controlled by the electric counting mechanism that counts the bags passing along the marshalling conveyor; this is described in more detail hereinafter with reference to FIGURE 3. The feed from the conveyor 3 to the sections 4 and 5 is controlled in a similar manner by the gate 7.

The bags are fed from the conveyors 2, 4 and 5 on to the marshalling plate 8, and as they are fed they are raked by the rake 9, which is controlled by the air cylinders 11 and 12 on to the stripping plate 13. The rake 9 has a lower flap portion which is hinged so that when the rake is in the position shown in FIGURE 1 any filled sacks on the marshalling plate are dragged by it on to the stripping plate 13. When the rake is returned from the stripping plate to the position shown, the hinged flap rides over any filled sacks that may have been fed to the marshalling plate while the rake was over the marshalling plate. The marshalling plate is divided by a division plate 14 which moves vertically in a slot in the marshalling plate. The division plate, which is operated by an air cylinder, divides the marshalling plate when it is raised into two areas, the area nearer to the conveyor 2 being approximately of the size required to accommodate the header sacks, and the area nearer to conveyor 5 being approximately of the size required to accommodate the stretcher sacks. The rake is provided with a slot so that it can move freely when the division plate is raised.

The stripping plate 13 is movable by an electric motor from its position shown, to cover the pallet lift 15. The pallet lift carries the pallet and is operated by an electric motor through lead screws attached to the pallet lift by means of a chain drive. The stripping bar 16 can be moved vertically by an air cylinder.

Figure 3:
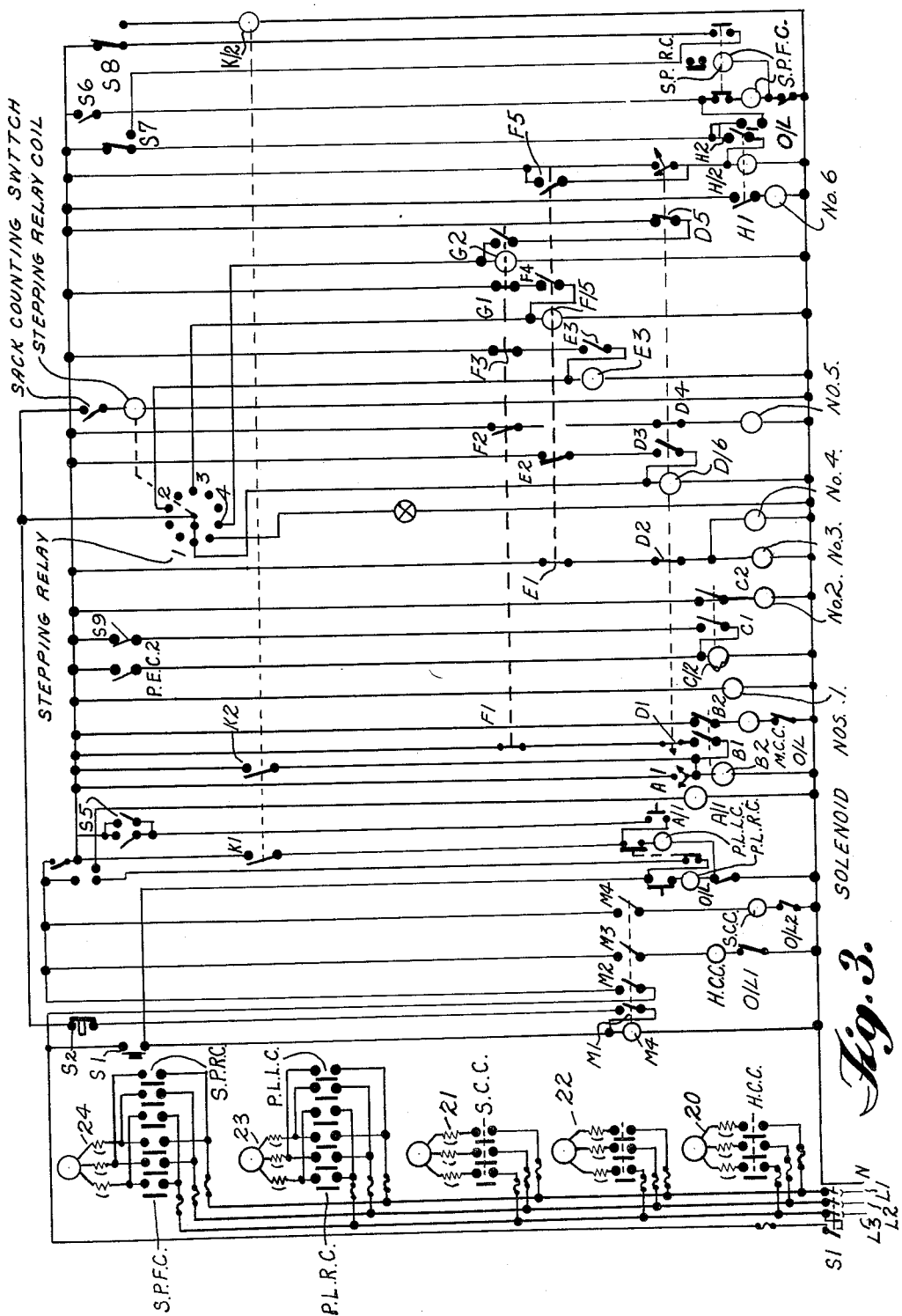
FIGURE 3 is an electrical circuit for the apparatus illustrated in FIGURES 1 and 2.

The electrical circuit used to operate the apparatus is shown in FIGURE 3, and is made up as follows. At the top of the drawing the motor operating conveyor 2 is shown at 20, the motor operating the marshalling conveyor 1 is shown at 21, and the motor operating conveyor 3 is shown at 22. The pallet lift motor is shown at 23 and the stripping plate motor at 24. The motors are fed from the lines L1, L2 and L3, and the switch operating the connectors to the motors is shown at S1. The neutral phase of the alternating current supply is indicated by the letter N. The start switch to set the apparatus in operation is shown at S1, and the stop switch is shown at S2. The contactors to operate motors 20, 21 and 22 are shown at HCC, MCC and SCC respectively. The contactors to cause the pallet lift to rise are shown at PLRC, and those to lower the pallet lift are shown at PLLC. The contactors to cause the stripping plate to move forward are shown at SPFC, and those to cause it to move backwards are shown at SPRC.

In FIGURE 4 all contacts and switches are shown in their normal positions i.e. with no current supplied. Relay M/4 (the letter denotes the coil, and the figure the number of contacts operated by the coil) is the master relay. M1 and S2 provide a hold-on for relay M. M2 controls the flow of current to the control circuit. M3 and M4 when closed energise the header conveyor 2 and the stretcher conveyor 3. The contactor of the motor 20 is shown in the line from M3 at HCC with its associated overload contact O/LI, and the contactor of the stretcher conveyor motor is shown in the line from M4 at SCC with its associated overload contact O/L2.

Contactors operated by the pallet are shown at PLRC and PLLC, the first being the pallet lift raise contactor, and the second the pallet lift lower contactor. The contacts operated by each of the contactors are shown by the dotted lines. The pallet lift raise contactor PLRC is energised by operation of switch S3 which is operated by the pallet lift when it reaches its top position. Switch S4 is operated by the pallet lift when it reaches its bottom position. S4 when closed energises the pallet lift lower contactor PLLC when K1 is closed. The contacts of K1 strike for ¼ second when K is energised. S4 also controls the solenoid 1 operating a pallet clamp the purpose of which is to ensure that the pallet is securely held to the pallet lift. The photoelectric cell PEC1 is placed so that the light beam is intercepted by the pallet lift; it is placed at a distance below the stripping plate in its forward position equal to 1 inch approximately allowing adequate clearance between the stripping plate and the sack layer immediately beneath it. The switch S5 is placed in a position where it is operated by the pallet lift as it moves downward. Its position is adjustable and its purpose is to allow the selected number of layers of sacks to be stacked, but no more; when it is set in position the automatic loading of the pallet continues until S5 is operated when it cuts out PEC1 and the pallet is lowered to the bottom limit switch S3.

The marshalling conveyor contactor is shown at MCC. PEC2 is a photoelectric cell the beam of which is interrupted whenever a bag arrives on the marshalling plate 8; interruption of the light beam to PEC2 causes relay C to be energised.

A rake 9 is provided for transferring sacks from the marshalling plate to the stripping plate. This rake is operated by an air cylinder which is controlled by solenoid 2. The air cylinder controlling the operation of gate 7 is controlled by solenoid 3, and the air cylinder controlling the operation of gate 6 is controlled by solenoid 5. The division plate 14, which divides the marshalling plate, is raised and lowered by an air cylinder which is controlled by solenoid 4.

The number of bags fed from each conveyor is controlled by the stepping relay with its associated coil and sack counting switch. The sack counting switch is mounted on the marshalling conveyor and is operated by the depression of a roller as a sack passes over the roller into a position immediately before the junction of the conveyors 2 and 3. The stepping relay is advanced one position each time the sack counting switch closes. In this embodiment, the stepping relay has ten positions and is intended to control the feeding of ten consecutive sacks to form two bonded layers of five sacks each.

The stripping bar 16 is lowered or raised by means of an air cylinder which is controlled by solenoid 6. The stripping bar when it reaches the top limit of its upward movement closes switches S6. The motor 24, which moves the stripping plate 13, has two contactors, the stripping plate forward contactor SPFC, which when energised causes the motor to operate and move the stripping plate forward, and the stripping plate reverse contactor SPRC, which when energised causes the stripping plate to move backwards. The stripping plate is provided with two limit switches, the forward limit switch S7, and the rear limit switch S8.

*Operation of Apparatus*

The apparatus is intended to stack filled sacks on pallets in layers of five sacks per layer. The first layer has three sacks lying side by side with two sacks lying end to end along the ends of the three side by side sacks, as in FIGURE 4(*a*). In the next layer the sacks are arranged in the same way but the pattern is rotated through 180° as in FIGURE 4(*b*). The operation is repeated until eight layers are built up, alternate layers being as shown in FIGURE 4(*a*), and the remaining layers being as shown in FIGURE 4(*b*). To achieve this the apparatus is arranged so that when the start button is pressed the gate 6 is in the position to open the way to conveyor 2 and three bags are fed in turn along conveyor 2 to the marshalling plate. The dividing plate 14 is in the down position. As each bag arrives on the marshalling plate it slides across the plate until it is stopped by a guide plate at the end of the marshalling plate, and is then pulled by the rake 9 across on to the stripping plate so that the three header sacks lie in the position shown in FIGURE 4(*a*).

The stepping relay and the associated mechanism then cause the gate 6 to swing across with the way to conveyor 3 open and with gate 7 closing the way to conveyor 5. Two more sacks are then fed and are each pulled by the rake on to the stripping plate so that they lie end to end as shown in FIGURE 4(a).

At this point feeding ceases, the stripping bar is raised, and the stripping plate moves forward. When it is right forward the stripping bar moves down, and the stripping plate moves back to its original position and in doing so causes the sacks to be transferred to the pallet supported on the pallet lift immediately under the stripping plate in its forward position.

Gate 6 swings over to open the passage to conveyor 2, the division plate 14 rises to divide the marshalling plate, and the pallet lift descends so that the layer of sacks is below the stripping plate level.

The feed of sacks re-commences and three sacks are fed from conveyor 2 on to the marshalling plate. Each sack in turn slides across the plate and is stopped by the division plate, and is then pulled by the rake on to the stripping plate so that the three sacks lie side by side as in FIGURE 4(b). Gate 6 swings across to open the way to conveyor 3. Gate 7 also swings across to open the way to conveyor 5. Two more sacks are fed and pulled by the rake so that they lie end to end as in FIGURE 4(b). The layer of sacks is stripped off and the pallet lift lowered.

The sequence of operations is repeated until the pallet lift operates switch S5 (this is arranged to take place when eight layers of sacks have been transferred to the pallet) when the pallet descends until it operates the bottom limit switch S4 and the lift stops. The loaded pallet is discharged, a fresh pallet loaded on the lift and the whole sequence is repeated.

In more detail the apparatus operates as follows:

If all bags have been cleared off the conveyors the following procedure must be carried out to ensure that the sequence is correct before pressing the start button.

When the isolator S1 is switched on, the supply to the stepping relay and sack counting switch is direct and does not pass through the master relay M; therefore to reset the machine the bag counting switch should be "pulsed" by hand until the indicating lamp illuminates; this indicates that the stepping relay is in the position immediately before position 1. A bag is then pushed by hand on to the conveyor until it operates the switch, the indicating lamp will go out and the stepping relay is on position 1 with a bag on the conveyor. The machine is then ready for automatic loading of the pallet.

When the stepping relay passes on to position 1, relay D becomes energised, contacts D2 and D4 open, contact D6 strikes for ¼ sec. and contact D1 breaks for a ¼ sec., but until the start button is pressed there is no supply to these contacts. Therefore they have no effect at this point.

The start button S1 is pressed. The master relay M becomes energised and maintains itself via the stop button S2 and contact M1, contact M2 closes and "makes" the supply to the control circuit, contacts M3 and M4 close and energise the semicircular conveyor 2 and the conveyors 3, 4 and 5. At the same instant that the start button is pressed, the pallet lift raise contactor PLRC is energised and maintained via the pallet lift top limit switch S3. As soon as the lift starts to rise the bottom limit switch S4 closes and makes supply to the control circuit and energises the pallet clamp solenoid (solenoid 1) direct.

When the pallet lift reaches the top position the top limit switch S3 changes over, thus de-energising the raise contactor PLRC and energising relay A; contact A1 strikes for a ¼ sec. and energises relay B which maintains itself via contacts F1, D1 and B1, contact B2 closes and energises the marshalling conveyor 2. Relay D remains energised and therefore solenoids 3 and 5 operating the gates are de-energised. Three header sacks are counted forward and the stepping relay moves on one position with each bag. As the fourth sack moves on to operate the sack counting switch the stepping relay moves on to position 2. Whenever a sack arrives on the marshalling plate the photoelectric cell No. 2 beam is interrupted and the photoelectric cell switch closes and energises relay C which is held on via the sack rake return limit switch S9 and contact C1; when the rake reaches its back stroke the limit switch is opened and thus de-energises relay C and hence the sack rake air solenoid is also de-energised; the rake is then returned by air pressure.

With the stepping relay in position number 2 relay E is energised and maintains itself via contacts F3 and E3, contact E2 opens and de-energises relay D which energises the two solenoids 3 and 5 operating the gates, but contact E1 opens and keeps the solenoid 3 (for gate 7) de-energised whilst the gate 6 changes over to close the way to conveyor 2 and open the way to conveyor 3. Two sacks are counted forward and the relay moves on two positions. The next bag moving forward to operate the bag counting switch causes the stepping relay to reach position 3.

With the stepping relay in position 3, relay F is energised and maintains itself via contacts G1 and F4, contact F3 opens and de-energises relay E which will energise solenoid 3 thereby causing gate 7 to swing over. The division plate is caused to rise, and contact F2 opens and de-energises solenoid 5 causing gate 6 to swing over to open the way to conveyor 2; contact F1 opens for a ¼ sec. and stops the marshalling conveyor, contact F5 strikes for a ¼ sec. and energises relay H, which maintains itself via the stripping plate forward limit switch S7 and contact H2, contact H1 closes and energises the stripping bar "raise" solenoid (solenoid 6), the bar moves up and closes the stripping bar top limit switch S6; this switch on closing energises the stripping plate forward contactor SPFC, which is also maintained via the forward limit switch and its own maintaining contact. When the stripping plate reaches the forward position the forward limit switch changes over thus de-energising the stripping bar solenoid which drops the bar down and also deenergises the forward contactor. On changing over, the forward limit switch energises the stripping plate reversing contactor which maintains itself via the rear limit switch and its own maintaining contact, and the plate therefore moves back, stripping the layer until the plate operates the rear limit switch.

When the stripping plate reaches the rear limit switch the switch changes over thus de-energising the reversing contactor and energising relay K; contact K2 strikes for a ¼ sec. and energises relay B which maintains itself via contacts F1, D1, and B1, contact B2 closes and energises the marshalling conveyor 2, contact K1 strikes for a ¼ sec. and energises the pallet lift lower contactor PLLC which maintains itself via the photoelectric cell No. 1 and its maintaining contact (the photoelectric cell closes when bags have interrupted the beam) and therefore the pallet lift lowers until the bags are clear of the photoelectric cell beam when the photoelectric cell contact opens and stops the lift by de-energising the pallet lift lower contactor PLLC.

With the energisation of relay B the marshalling conveyor 1 starts, and three header sacks are fed in succession to the marshalling plate. As each sack is fed the beam of the photoelectric cell 2 is interrupted and the photoelectric cell switch is closed energising relay C which is held on via the sack return limit switch S9 and contact C1. This in turn causes solenoid 2 to be energised causing the rake to operate and move each sack across to the stripping plate. Since the division plate 14 is in the raised position, the three header sacks will lie in the position shown in FIGURE 4(b).

When the fourth bag moves forward to operate the sack counting switch, the stepping relay moves on to position 4. Relay G is then energised and maintains itself via contact D5 and G2; contact G1 opens and de-energises relay F, contact F2 closes and energises solenoid 5 to cause gate 7 to swing over to close the path to conveyor 2. The gate 7 is in position to open the path to conveyor 5 and the solenoid 3 controlling the operation of this gate remains energised and maintains the gate in this position. The next two bags from conveyor 1 are therefore counted forward and are moved by the rake in the end to end position shown in FIGURE 4(b).

When the next bag is counted on conveyor 1, the stepping relay moves on to position 1. Relay D is energised and maintains itself via contacts E2 and D3, contacts D2 and D4 open and de-energise the solenoids 3 and 5 controlling gates 7 and 6 which accordingly swing over 7 closing the path to conveyor 5, and gate 6 opening the path to conveyor 2; solenoid 4 is also de-energised causing the division plate to be lowered. Contact D5 opens and de-energises relay G, contact D1 opens for a ¼ sec. and de-energises relay B which stops the marshalling conveyor, contact D6 strikes for a ¼ sec. and energizes relay H which maintains itself via the stripping plate forward limit switch S7 and contact H2, contact H1 closes and energises the stripping bar raise solenoid (solenoid 6), the bar moves up and closes the stripping bar top limit switch S6; S6 on closing energises the stripping plate forward contactor SPFC, which is also maintained via the forward limit switch and its own maintaining contact. When the stripping plate reaches the forward position, the forward limit switch changes over thus de-energising the stripping bar solenoid which drops the bar down and also de-energises the forward contactor. On changing over the forward limit switch energises the stripping plate reversing contactor which maintains itself via the rear limit switch and its own maintaining contact, and the plate therefore moves back, stripping the layer until it operates the rear limit switch. The sequence then continues until the pallet lift reaches first the switch 85 which causes the lift to continue to descend until it reaches the bottom limit switch which opens and cuts out the control system and also de-energises the pallet clamp. The operator then removes the loaded pallet, positions an empty pallet on the lift, and presses the start button to raise the pallet and carry on loading.

The foregoing embodiment illustrates the use of a stepping relay for automatically controlling the operation of our apparatus. In embodiments described hereinafter with reference to FIGURES 5, 6 and 7, use is made of a rotary selector switch to provide the automatic controlling means.

In our second embodiment FIGURE 5 illustrates diagrammatically the positions of the various motors and switches. FIGURE 6 is the circuit diagram and FIGURE 7 shows the switches operated by the cams of the rotary selector switch in each of its positions in one complete revolution.

The rotary selector switch is caused to rotate by a pulse operated solenoid which is caused to be operated by the various pulse switches in the apparatus hereinafter described. The solenoid operates a pawl and ratchet which causes the selector switch to rotate 10° on each pulse so that in one complete revolution it occupies 36 different positions. The switch carries 22 cams which operate microswitches forming part of the electric circuit. FIGURE 7 is a table showing the switches that are closed in each of the 36 positions of switch.

Figure 1:
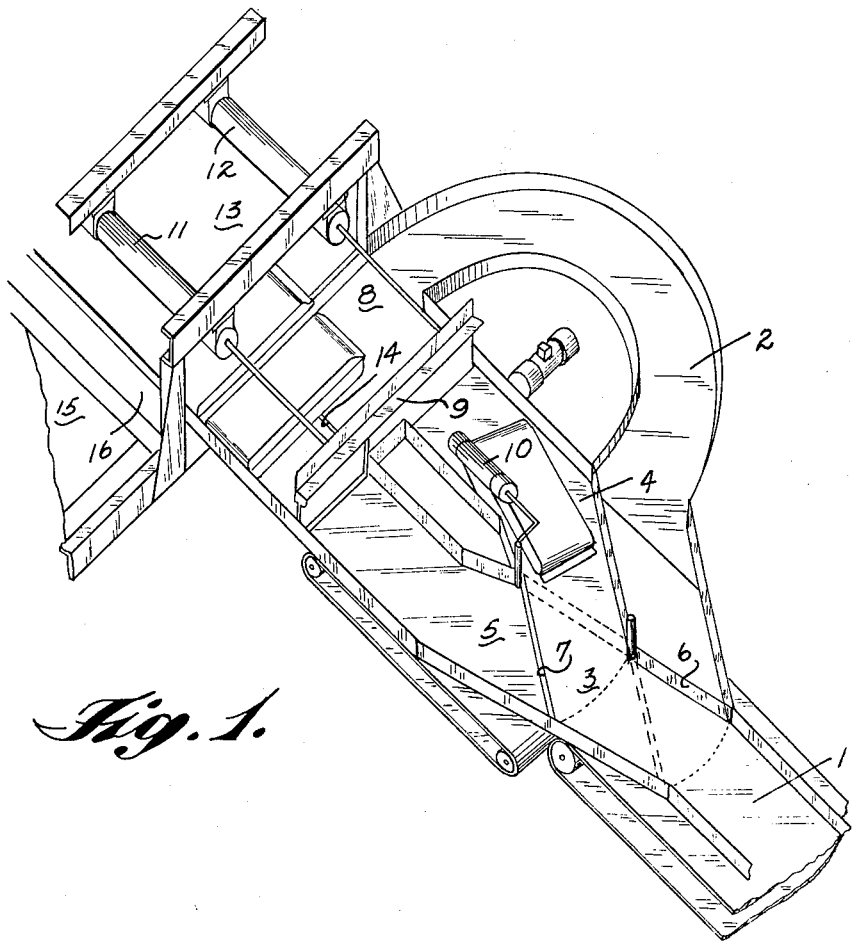
FIGURE 1 is a perspective view of one embodiment of our apparatus.
Figure 2:
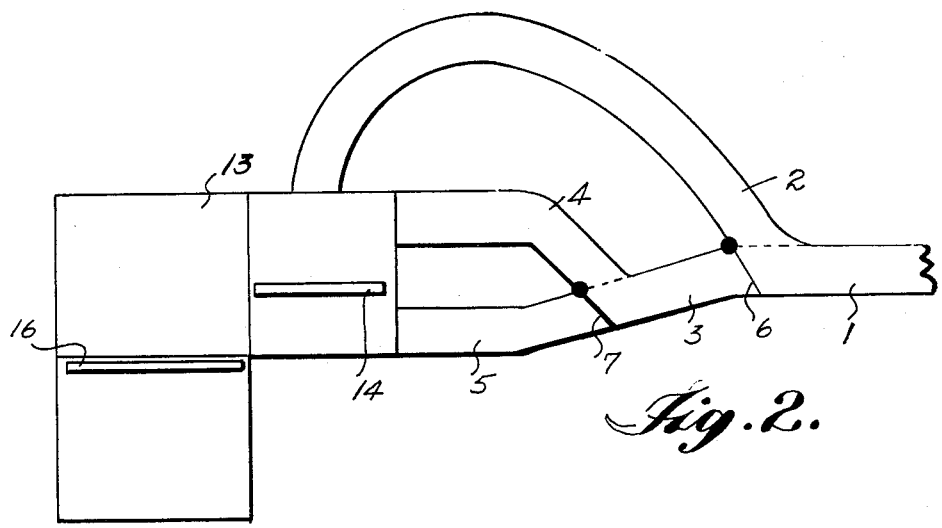
FIGURE 2 is a simplified plan view of the same apparatus.

The apparatus is generally similar to that illustrated in FIGURE 1 but is modified in certain respects. It is provided with a pallet dispenser which automatically feeds pallets to the pallet lift. The pallet dispenser is in the position shown in FIGURES 5 and 5(a) with respect to other parts of the apparatus. It consists of a container holding a number of pallets one on top of the other. At the bottom and to one side is a pair of lazy tongs which, when an appropriate circuit is made, push out the bottom pallet on to the pallet lift. The pallet dispenser is the subject of British patent application 36163/58. The pallet lift is operated by lead screws which are caused to operate by a chain drive passing round the nut part of the screws.

*General Description of Apparatus and Its Operation*

FIGURES 5 and 5(a) show diagrammatic plan views of the apparatus illustrating the positions of the various motors and switches and the various essential parts of the apparatus.

In FIGURES 5(a) and 5(b) the main feed for containers is the roller conveyor 21 having the main gate 22 operated by rams that raise and lower it to allow containers to pass underneath it by the action of gravity. Beyond the gate 22 is the roller 23 which operates pulse switch PS1. The direction of feed from conveyor 21 is controlled by the two gates 24 and 25 operated by the rams 26 and 27 respectively. The gate 24 is fitted with a moving side wall operated by the motor 6 so that containers are easily carried forward from the main feed to the semicircular conveyor. At the feed end of the semicircular conveyor is the cross ram 28 which is controlled to move containers from the semicircular conveyor either to the far side of the assembly area 29 or only two thirds of the way across. The ram carries the extension piece 32 which can move below the cylinder and the face of which pulls the containers across the assembly area 29. The plate 33 is ram operated and forms the device that limits the stroke of ram 28. Ram operated lazy tongs 30 and 31 are provided to slide the containers from the assembly area to the stripping plate 34. As shown in FIGURE 5(c), a like extension plate 32 is attached to each of the lazy tongs 30 and 31 by a one-way pivot connection so that when the tongs are moved in one direction, the plate 32 carries with it a container, but when moved in the opposite direction, the plate pivots upwardly and rides over the top surface of a container.

In operating the apparatus the start button is pressed and the pallet dispenser motor M3 causes the lazy tongs to operate and push out the bottom pallet on to the pallet lift. The pallet is clamped on and the lift rises until the lift top limit switch pulses LSP1. The main gate is then caused to rise and the first container moves forward operating the pulse switch PS1 as it moves forward. The gate 24 is in the position across the feed entry to the semicircular conveyor. The first container therefore moves straight forward on to the assembly area and is pulled by the lazy tongs operated by ram 30 across to the stripping plate. The second container is likewise fed to the stripping plate. As the second container is fed it operates pulse switch 23 which causes gate 24 to open to the position shown in FIGURE 5(a) after the second container has passed on to the assembly area 29.

The third container is then fed and this is carried by the moving side wall of gate 24 on to the semicircular conveyor. When the third container reaches the feed end of the semicircular conveyor it is pulled by the cross ram right across the assembly area and as it arrives on the far side the lazy tongs operated by ram 31 draw it on to the stripping plate. The fourth and fifth containers are likewise fed round the semicircular conveyor on to the assembly area and drawn by the lazy tongs operated by ram 31 on to the stripping plate 34. The layer of containers on the stripping plate is in the arrangement shown in FIGURE 4(a). The stripping bar 35 now rises and the stripping plate moves forward to its extreme position and the stripping bar then moves down again. When the bar is right down the stripping plate is withdrawn causing the containers to be transferred to the pallet.

When stripping is completed the pallet lift moves down until it is stopped when the containers are just below the stripping plate position. The descent of the pallet lift is controlled by a photoelectrically operated switch. While the lift is descending feeding of the second layer of containers starts. The gate 24 is back in position closing the entry to the semicircular conveyor and the gate 25 is moved forward in the direction of the arrow. Two containers are then fed from the main conveyor on to the assembly area and are drawn by the lazy tongs operated by ram 31 on to the stripping plate, the gate 24 then moves back to the position shown in FIGURE 5(a) and feeding round the semicircular conveyor then starts. The stroke limiting device 33 is now in position to limit the length of stroke of the arm 32.

The third container is fed round the semicircular conveyor and is drawn on to the assembly area from which it is drawn by the lazy tongs operated by ram 30 on to the stripping plate. The fourth and fifth containers are likewise fed to the stripping plate so that the containers are arranged on the stripping plate as shown in FIGURE 4(b).

The devices operated by the rams to carry the containers forward in the various directions take the form of hinged flaps that contact the container and carry it forward in the required direction but which on the return stroke can pass over a container or will allow a container to pass underneath without obstructing its passage.

After stripping the second layer, feeding continues with the pattern alternating until eight layers have been built. When the final layer has been stripped, the pallet lift is caused to descend with the photocell control cut out. It is stopped when the bottom limit switch is tripped. The pallet dispenser motor then operates to cause a pallet to be pushed forward, and in doing so to cause the loaded pallet to be pushed forward from the pallet lift on to a powdered conveyor.

The automatic control of the apparatus is provided by the rotary selector switch (which provides overall control) and the various limit switches which are operated by each moving part of the apparatus at an appropriate position in the course of its travel. The detailed description of the electrical operation of our apparatus is described hereinafter.

*Detailed Description of Electrical Circuit and Method of Operating Apparatus*

In FIGURES 5 and 6 the references have the following meanings:

Motor 1: semicircular conveyor motor
Motor 2: straight conveyor motor
Motor 3: pallet dispenser motor
Motor 4: main lift motor
Motor 5: run-off conveyor motor
Motor 6: gate side wall motor
Motor 7: stripping plate motor
S.V.1: solenoid valve operating main gate
S.V.2: solenoid valve operating ram for gate 24
S.V.3: solenoid valve operating ram for gate 25
S.V.4: solenoid valve operating cross ram
S.V.5: solenoid valve operating ram holding pulse switch 3
S.V.6: solenoid valve operating ram holding pulse switch 4
S.V.7: solenoid valve operating ram operating cross ram stop
S.V.8: solenoid valve operating lazy tongs right hand [1]
S.V.9: solenoid valve operating lazy tongs left hand [1]
S.V.10: solenoid valve operating stripping bar rams
S.V.11: solenoid valve operating pallet clamp rams
P.S.1: roller operated pulse switch
P.S.2: back-stop cross-ram pulse switch
P.S.3: sack operated pulse switch on straight conveyor left hand [1]
P.S.4: sack operated pulse switch on straight conveyor right hand [1]
P.S.5: cross ram intermediate stop pulse switch
P.S.6: lazy tongs operated intermediate pulse switch right hand [1]
P.S.7: lazy tongs operated intermediate pulse switch left hand [1]

[1] As viewed from main feed end of machine.

LSP1: lift top limit pulse switch
LSP2: stripping plate back limit pulse switch
LSP3: stripping plate intermediate limit pulse switch
LSP4: stripping plate front limit pulse switch
LSP5: main lift intermediate limit switch
LSP6: main lift bottom limit switch
LSP7: power run-off conveyor limit switch
LS1: pallet dispenser back limit switch
LS2: pallet dispenser intermediate limit switch
LS3: pallet dispenser front limit switch
LS4: gate 24 sack operated limit switch
LS5: main lift intermediate limit switch
LS6: main lift bottom limit switch
LS7: power run-off conveyor limit switch
LSS1: main lift top safety limit switch
LSS2: main lift bottom safety limit switch
CTR.1: motor 3 contactor
CTR.2: motor 7 contactor
CTR.3: motor 4 contactor
CTR.4: motors 1 and 2 contactors
CTR.5: mains contactor
CTR.6: motor No. 5 contactor
RL.1: pallet dispenser start relay
RL.2: pallet dispenser reversing relay
RL.3: stripping plate reversing relay
RL.4: solenoid valve 10 hold relay
RL.5: lift top relay
RL.6: lift top limit pulse switch delay relay
RL.7: solenoid valve 8 delay relay
RL.8: solenoid valve 9 delay relay
RL.9: cross-ram self hold relay
RL.10: stripping plate start relay
RL.11: solenoid valve 4 delay relay
RL.12: 6.8K sealed relay (photo cell)

In addition to these references, conventionally shown rectifiers are shown at numbers 1, 2, 3, 4, 5 and 6 in FIGURE 7. Where the limit switches have more than one contact these are shown by the letters A, B etc. Thus limit switch LS.5 has the three contacting positions A, B and C.

In the following description the right and left hand sides of the machine are as viewed from the main feed end of the machine.

With main lift at bottom position limit switch LS6 will be operated, therefore when the supply is switched on by the start button the delay coil RL1 will energise via the capacitor and LS6A. Contact RL1 will close and energise the pallet dispenser forward contactor via L1 (CTR1), O/L contact, contact RL1 and limit switch LS3B back to L2 (CTR1). As the pallet dispenser moves forward, limit switch LS6A will open and the forward contactor is self maintained via L1 (CTR1), O/L contact, maintaining contact, switch LS3B through coil to L2 (CTR1). When the pallet dispenser arrives at the forward position, limit switch LS3 changes over thus de-energising the forward contactor and energising the reverse contactor via L1 (CTR1), O/L contact, contact RL2, switch LS1 through coil to L2 (CTR1). As the pallet dispenser reverses LS3 will change back and the reverse contactor is self maintained via L1 (CTR1), O/L contact, maintaining contact, switch LS1 through coil to L2 (CTR1). Whilst the pallet dispenser is reversing the intermediate limit switch LS2 operates and energises the main lift "raise" contactor via L1 (CTR3), O/L contact, switch LS2, through coil F, contact R1, switches LSS1 and LSP1B to L3 (CTR3) and is maintained energised via L1 (CTR3), O/L contact, contact F1 through coil F, switches LSS1 and LSP1B to L3 (CTR3). When the pallet dispenser has reversed to the original position, limit switch LS1 operates and de-energises the reverse contactor.

After the main lift has risen one foot limit switch LS5 is released (this switch is operated while the main lift is in the lowered position), contact LS5A closes and connects neutral line to relay RL5, contact LS5B opens and de-energises SV11 which clamps the pallet to the lift, contact LS5C closes and connects L1 (CTR4) to conveyor contactors. When the main lift is in the fully raised position limit switch LSP1 operates, contact LSP1B opens and de-energises the raise contactor (lift stops) contact LSP1A will close and energise relay RL5 via contact LSP1A, through coil RL5 and contact LS5A, relay RL5 is then self maintained from line, contact RL5B through coil RL5 and contact LS5A. On energising relay RL5, contact RL5B closes and connects supply to rectifier No. 3 via selector switch contact No. 14 which is closed at this point in the sequence. Rectifier No. 3 energises relay RL6 direct (relay RL6 is a delay relay) and contact RL6 closes connecting supply to rectifier No. 4. Rectifier No. 4 pulses selector switch solenoid and selector switch moves round one step (position number 2). Selector switch contacts Nos. 1 and 2 close and energise the operating coils A and B of CTR4 which start the straight conveyor and semicircular conveyor motors (note these motors run throughout the sequence).

Selector switch contacts Nos. 6, 9 and 11 close and energise solenoid valves SV1, SV2 and SV6 respectively. Selector switch contact No. 15 closes and connects supply to PS1 (ineffective at this point). SV1 lifts main gate ram and allows sack No. 1 to pass through, SV2 operates gate 24 and causes sacks to move along straight conveyor (SV3 is de-energised therefore the stretcher bags for this layer are on the right hand side of the machine), SV6 lifts switch PS4 to operating position. Sack No. 1 passes along straight conveyor and operates switch PS1. Switch PS1 pulses the selector switch to position No. 3 via line, selector switch contact No. 15 (closed in position No. 2), switch PS1 to rectifier No. 4 which energises the selector switch solenoid. In position No. 3 selector switch contacts Nos. 9 and 11 remain closed (energising SV2 and SV6), selector switch contact No. 6 opens and de-energises SV1, the main gate and prevents any more bags passing through, selector switch contact No. 17 closes and connects supply to PS4 and PS5 (ineffective at this point). Sack No. 1 is continuing along conveyor to the acceptance plate position and operates switch PS4 which pulses the selector switch to position No. 4 via line, selector switch contact No. 17, switch PS4 to rectifier No. 4 which energises the selector switch solenoid.

In position No. 4 selector switch contacts Nos. 9 and 11 remain closed (energising SV2 and SV6), selector switch No. 15 closes and connects supply to PS1 (ineffective at this point), selector switch contact No. 6 closes and energises SV1, SV1 lifts the main gate and allows sack No. 2 to pass through. Sack No. 2 passes along the straight conveyor and operates PS1 which pulses the selector switch to position No. 5. In position No. 5, selector switch contact No. 9 remains closed (energising SV2), selector switch contact No. 8 closes and connects supply from rectifier No. 6 to relay RL7, contact RL7/1 will close and energise SV8 which operates the right hand lazy tong and removes sack No. 1 from the acceptance plate to the stripping plate. As the sack No. 1 is removed from the acceptance plate switch PS6 is operated and pulses the selector switch to position No. 6 via line, selector switch contact No. 19 to rectifier No. 4 which energises selector switch solenoid. In position No. 6 selector switch contact No. 8 opens and de-energises SV8, which returns the right hand lazy tong to the acceptance plate position, selector switch contact No. 9 opens and de-energises SV2 which deflects the bags around the semicircular conveyor, selector switch contact No. 11 remains closed (energising SV6), selector switch contact No. 17 closes and connects supply to PS3 and PS4 (ineffective at this point). Sack No. 2 continues along conveyor and operates switch PS4, which pulses selector switch to position No. 7 via line, selector switch contact No. 17, switch PS4 to rectifier No. 4 which energises selector switch solenoid.

With selector switch in position No. 7 selector switch contact No. 11 opens and de-energises SV6 which removes switch PS4 from operating position, selector switch contact No. 20 closes and connects supply to PS5 (ineffective at this point), selector switch contact No. 8 closes and connects supply from rectifier No. 6 to relay No. RL7, contact RL7/1 closes and energises SV8 which operates the right hand lazy tong and removes sack No. 2 from the acceptance plate to the stripping plate. As the sack is removed from the acceptance plate position switch PS6 is operated and pulses the selector switch to position No. 8 via line, selector switch contact No. 19, switch PS7 to rectifier No. 4 which energises the selector switch solenoid. In position No. 8 selector switch contact No. 8 opens and de-energises SV8 which returns the right hand lazy tong to the acceptance plate position, selector switch contact No. 15 closes and connects supply to PS1 (ineffective at this point), selector switch contact No. 4 closes and energises motor No. 6 direct via line and neutral which starts the side belt round gate 24, selector switch contact No. 6 closes and energises SV1 direct which lifts the main gate and allows sack No. 3 to pass through.

Sack No. 3 now continues around the semicircular conveyor and operates switch PS1 which pulses the selector switch to position No. 9 via line, selector switch contact No. 15 to rectifier No. 4 which energises the selector switch solenoid. In position No. 9 selector switch contact No. 4 remains closed (energising motor No. 6), selector switch contact No. 16 closes and connects supply to switches PS2 and PS5 (ineffective at this point). Sack No. 3 continues round the conveyor and operates switch LS4, switch LS4 operates relay RL9 via line, switch LS4 through coil RL9 and selector switch contact No. 2, the relay is then self maintained via line, contact RL9/2 through coil RL9 and selector switch contact No. 2, relay contact RL9/1 closes and connects supply to rectifier No. 5 which energises relay RL11 direct, relay contact RL11/1 closes and energises SV4 which operates the cross ram solenoid and removes the sack No. 3 from the semicircular conveyor to the acceptance plate (it should be noted at this point that SV7 is de-energised therefore the cross ram stop plate is up, i.e. header sacks are on the left hand side of the machine for this layer of sacks).

As the bag is removed from the semicircular conveyor, switch PS2 is operated and the selector switch is pulsed to position No. 10 via line, selector switch contact No. 16, switch PS2 to rectifier No. 4 which energises selector switch solenoid. In position No. 10 selector switch contact No. 4 remains closed (energising motor No. 6), selector switch contact No. 2 opens and de-energises relay RL9 which in turn de-energises SV4, the cross ram returns to the semicircular conveyor position, selector switch contact No. 15 closes and connects supply to PS1 (ineffective at this point), selector switch contact No. 6 closes and energises SV1 which raises the main gate and allows bag No. 4 to pass through.

Sack No. 4 passes around the semicircular conveyor and operates PS1 which pulses the selector switch to position No. 11 via line, selector switch contact No. 15, switch PS1 to rectifier No. 4 which energises selector switch solenoid. In position No. 11 selector switch contact No. 4 remains closed (energizing motor No. 6), selector switch contact No. 19 closes and connects supply to PS7 (ineffective at this point), selector switch contact No. 7 closes and energises relay RL8 direct, relay contact RL8/1 closes and energises SV9 which operates the left hand lazy tong and sack No. 3 is removed from the acceptance plate to the stripping plate. As the sack No. 3 is removed from the acceptance plate switch PS7 is operated and pulses the selector switch to position No. 12 via line, selector switch contact No. 20, switch PS7 to rectifier No. 4 which energises the selector switch solenoid.

In position No. 12 selector switch contact No. 2 closes and connects neutral line to relay RL9 (ineffective at this point), selector switch contact No. 4 remains closed (energising motor No. 6), selector switch contact No. 16 closes and connects supply to switches PS2 and PS5 (ineffective at this point), selector switch contact No. 7 opens and de-energises relay RL8 which in turn de-energises SV9, the left hand lazy tong returns to the acceptance plate position. Sack No. 4 continues around conveyor and operates switch LS4, switch LS4 energises relay RL9 via line, switch LS4, through coil RL9 and selector switch contact No. 2, relay contact RL9/1 closes and connects supply to rectifier No. 5 which energizes relay RL11 direct, relay contact RL11/1 closes and energises SV4 which operates the cross ram solenoid and removes the sack No. 4 from the semicircular conveyor to the acceptance plate.

As the sack No. 4 is removed from the semicircular conveyor switch PS2 is operated which pulses the selector switch to position No. 13 via line, selector switch contact No. 16, switch PS2 to rectifier No. 4 which energises the selector switch solenoid. In position No. 13 selector switch contact No. 4 remains closed (energising motor No 16), selector switch contact No. 2 opens and de-energises SV4 which returns the cross ram to the semicircular conveyor position, selector switch contact No. 15 closes and connects supply to switch PS1 (ineffective at this point), selector switch contact No. 6 closes and energizes SV1 which raises the main gate and allows sack No. 5 to pass through.

As the sack No. 5 passes along the conveyor, switch PS1 is operated and pulses the selector switch to position No. 14 via line, selector switch contact No. 15, switch PS1 to rectifier No. 4 which energises the selector switch solenoid. In position No. 14 selector switch contact No. 4 remains closed (energising motor No. 6), selector switch contact No. 19 closes and connects supply to PS7 (ineffective at this point), selector switch contact No. 7 energises relay RL8 direct, relay contact RL8/1 closes and energises SV9 which operates the left hand lazy tong and removes sack No. 4 from the acceptance plate to the stripping plate. As the sack No. 4 is removed from the acceptance plate switch PS7 is operated which pulses the selector switch to position No. 15 via line, selector switch contact No. 19, switch PS7 to rectifier No. 4 which energises selector switch solenoid. In position No. 15 selector switch contact No. 2 closes and connects neutral line to relay RL9 (ineffective at this point), selector switch contact No. 4 remains closed (energising motor No. 6), selector switch contact No. 16 closes and connects the supply to switches PS2 and PS5 (ineffective at this point), selector switch contact No. 7 opens and deenergises SV9 which returns the left hand lazy tong to the acceptance plate position.

Sack No. 5 continues around conveyor and operates switch LS4, switch LS4 energises relay RL9 via line, switch LS4 through coil RL9 and selector switch contact No. 2, relay contact RL9/1 closes and connects supply to rectifier No. 5 which energises relay RL11 direct, relay contact RL11/1 closes and energises SV4 which operates the cross ram solenoid and removes sack No. 5 from the semicircular conveyor to the acceptance plate. As sack No. 5 is removed from the semi-circular conveyor switch PS2 is operated and pulses selector switch to position No. 16 via line, selector switch contact No. 16 switch PS2 to rectifier No. 4 which energises the selector switch solenoid. In position No. 16 selector switch contact No. 4 opens and de-energises motor No. 6 which stops the belt on gate 24, selector switch contact No. 2 opens and de-energises relay RL9 which in turn de-energises SV4 and returns the cross ram to the semicircular conveyor position, selector switch contact No. 19 closes and connects supply to PS7 (ineffective at this point), selector switch contact No. 7 closes and energises relay RL8, relay contact RL8/1 closes and energises SV9 direct which operates the left hand lazy tong and removes sack No. 5 from the acceptance plate to the stripping plate.

As the sack No. 5 is removed from the acceptance plate switch PS7 is operated and pulses the selector switch to position No. 17. In position No. 17 selector switch contact No. 5 closes and energises relay RL10 direct, contact RL10/1 closes and energises the stripping plate forward contactor via L1 (CTR2), O/L contact, relay contact RL10/1, switch contact LSP4D, through coil F to L2 (CTR2), the contactor is then self maintained via L1 (CTR2), O/L contact, contact F, switch contact LSP4D, through coil F to L2 (CTR2), the stripping plate now moves forward, selector switch contact No. 22 closes and connects supply to switch contact LSP4C (ineffective at this point). When the stripping plate is in the fully forward position switch LSP4 is operated, switch contact LSP4D opens and de-energises the stripping plate forward contactor, switch contact LSP4B closes and energises relay RL4 direct, relay contact RL4 closes and energises SV10 (relays RL4 and SV10 are then maintained via line, relay contact RL4 and switch contact LSP2B), with SV10 energised the stripping bar rams are operated and the stripping bar is pulled down, switch contact LSP4A closes and energises relay RL3 from rectifier No. 2, relay contact No. RL3 closes and energises the stripping plate reverse contactor via L1 (CTR2), O/L contact, relay contact RL3, switch contact LSP2A, through coil R to L2 (CTR2), the reverse contactor is then self maintained via L1 (CTR2), O/L contact, contact R, switch contact LSP2A through coil R to L2 (CTR2), switch contact No. LSP4C closes and pulses the selector switch to position No. 18 via line, selector switch contact No. 22, to rectifier No. 4 which energises the selector switch solenoid to position No. 18 via line, selector switch contact No. 22, switch contact LSP4C to rectifier No. 4 which energises selector switch solenoid. The stripping plate reverses and the sacks are transferred from the stripping plate to the pallet.

In position No. 18 selector switch contact No. 5 opens and de-energises relay RL10 (ineffective at this point), selector switch contact No. 22 opens and disconnects supply to switch contact LSP4C (ineffective at this point), selector switch contact No. 21 closes and connects supply to switch contact LSP3A. As the stripping plate is reversing switch LSP3 is operated, switch contact LSP3B closes and operates the motor No. 4 lower contactor via L1 (CTR3), O/L contact, link, switch contact LSP3B through coil L, normally closed contact on Raise contactor relay contact RL12/1, switch contact LSS2, switch contact LS6B to L3 (CTR3), the lower contactor is then maintained by contact X (connected across switch contact LSP3B); the lift starts to descend, switch contact LSP3A closes and pulses selector switch to position No. 19 via line, selector switch contact No. 21 to rectifier No. 4 which energises the selector switch solenoid.

The stripping plate continues to reverse to the original position and operates switch LSP2, switch contact LSP2A opens and stops the reverse contactor (stripping plate stops), switch contact LSP2B opens and de-energises SV 10 which raises the stripping bar. As the sacks are being removed from the stripping plate to the pallet the light source from the photoelectric cell is interrupted and relay RL12 is de-energised; when the lift has descended to a point where the light source is completed relay RL12 energises, relay contact RL12/1 opens and de-energises the lift lower contactor, and the lift stops. With the selector switch in position 19, selector switch contacts Nos. 6, 9, 10, 13 and 15 close, selector switch contact No. 6 energises SV1 direct which lifts the main gate and allows sack No. 6 to pass through; selector switch contact No. 9 energises SV2 direct and operates the gate 24 which deflects the sacks on to the straight conveyor, selector switch contact No. 10 energises SV3 direct which operates the gate 25 and deflects the stretcher sacks to the left hand side of the machine; selector switch contact No. 13 energises SV5 which raises switch PS3 to the operating position, selector switch contact No. 15 connects supply to PS1 (ineffective at this point).

Sack No. 6 passes along the straight conveyor and is deflected to the left hand side of the machine; it operates switch PS1 which pulses the selector switch to position No. 20. In position No. 20 selector switch contact No. 6 opens and de-energises SV1 which drops the main gate and prevents any more sacks passing through; selector switch contacts Nos. 9 and 10 remain closed (energising SV2 and SV3), selector switch contact No. 13 remains closed (energising SV5), selector switch contact No. 19 closes and connects supply to PS7 (ineffective at this point). Sack No. 6 reaches the acceptance plate and operates switch PS3 which pulses the selector switch to position No. 21. In position 21 selector switch contact No. 6 closes and energises SV1 which raises the main gate and allows bag No. 7 to pass through; selector switch contacts 9 and 10 remain closed (energising SV2 and SV3), selector switch contact No. 13 remains closed (energising SV5), selector switch contact No. 15 closes and connects supply to PS1 (ineffective at this point).

Sack No. 7 passes along straight conveyor and operates PS1 which pulses the selector switch to position No. 22 via line, selector switch contact No. 15, switch PS1 to rectifier No. 4 which energises selector switch solenoid. In position No. 22 selector switch contacts Nos. 9 and 10 remain closed (energising SV2 and SV3), selector switch contact No. 13 remains closed (energising SV5), selector switch contact No. 19 closes and connects supply to switch PS7 (ineffective at this point), selector switch contact No. 7 closes and energises relay RL8 direct, relay contact RL8/1 energises SV9 direct which operates the left hand lazy tong and removes sack No. 6 from the acceptance plate to the stripping plate. As the sack No. 6 is removed from the acceptance plate switch PS7 is operated which pulses the selector switch to position No. 23 via line, selector switch contact No. 19, switch PS7 to rectifier No. 4 which energises the selector switch solenoid. In position No. 23 selector switch contacts Nos. 9 and 10 remain closed (energising SV2 and SV3), selector switch contact No. 13 remains closed (energising SV5), selector switch contact No. 17 closes and connects supply to switches PS3 and PS4 (ineffective at this point), selector switch contact No. 7 opens and de-energises SV9 which returns the left hand lazy tong to the acceptance plate position.

Sack No. 7 continues along straight conveyor and operates switch PS3 which pulses selector switch to position No. 24. In position No. 24 selector switch contact No. 10 opens and de-energises SV3 which returns the gate 25 to the position shown in FIGURE 5(a); selector switch contact No. 9 opens and de-energises SV2 which returns the gate 24 and deflects sacks around the semicircular conveyor, selector switch contact No. 13 opens and de-energises SV5 which removes switch PS3 from operating position, selector switch contact No. 19 closes and connects supply to PS7 (ineffective at this point), selector switch contact No. 7 closes and energises relay RL8 direct, relay contact RL8/1 closes and energises SV9 direct which operates the left hand lazy tong and removes sack No. 7 from the acceptance plate to the stripping plate. As sack No. 7 is removed from the acceptance plate switch PS7 is operated and selector switch is pulsed to position No. 25 via line, selector switch contact No. 19, switch PS7 to rectifier No. 4 which energises the selector switch solenoid.

In position No. 25 selector switch contact No. 4 closes and energises motor No. 6 direct from line and neutral, which starts the belt of gate 24, selector switch contact No. 6 closes and energises SV1 direct which raises the main gate and allows sack No. 8 to pass through, selector switch contact No. 12 closes and energises SV7 which pulls down the cross ram stop plate (i.e. header sacks on right hand side of machine), selector switch contact No. 15 closes and connects supply to switch PS1 (ineffective at this point). Sack No. 8 passes around semicircular conveyor and operates switch PS1 which pulses the selector switch to position No. 26 via line, selector switch contact No. 15 to rectifier No. 4 which operates the selector switch solenoid. In position No. 26 selector switch contact No. 4 remains closed (energising motor No. 6), selector switch contact No. 12 remains closed (energising SV7), selector switch contact No. 16 closes and connects supply to switches PS2 and PS5 (ineffective at this point), selector switch contact No. 6 opens and de-energises SV1 which drops main gate, selector switch contact No. 2 closes and connects neutral line to relay RL9 (ineffective at this point).

Sack No. 8 continues round the semicircular conveyor and operates switch LS4 which energises relay RL9 via line, switch LS4, coil RL9, selector contact No. 2, relay contact RL9/2 closes and maintains relay RL9 via selector switch contact No. 2, relay contact RL9/1 closes and connects the supply to rectifier No. 5 which energises relay RL11, relay contact RL11/1 closes and energises SV4 which operates the cross ram and sack No. 8 is removed from the semicircular conveyor to the acceptance plate (stopped by cross ram stop plate).

As the sack No. 8 is removed from the semicircular conveyor switch PS5 is operated and pulses the selector switch to position No. 27 via line, selector switch contact No. 16 to rectifier No. 4 which energises the selector switch solenoid. In position No. 27 selector switch contact No. 2 opens and de-energises relay RL9 which in turn de-energises SV4 and returns the cross ram to the semicircular conveyor position, selector switch contact No. 6 closes and energises SV1 which raises the main gate and allows sack No. 9 to pass through, selector switch contact No. 4 remains closed (energising motor No. 6), selector switch contact No .12 remains closed (energising SV7), selector switch contact No. 15 closes and connects supply to switch PS1 (ineffective at this point).

Sack No. 9 passes around the semicircular conveyor and operates PS1 which pulses the selector switch to position No. 28 via line, selector switch contact No. 15, switch PS1 to rectifier No. 4 which energises selector switch solenoid. In position No. 28 selector switch contact No. 4 remains closed (energising motor No. 6), selector switch contact No. 6 opens and de-energises SV1 which drops the main gate, selector switch contact No. 12 remains closed (energising SV7), selector switch contact No. 20 closes and connects supply to PS6 (ineffective at this point), selector switch contact No. 8 closes and energises relay RL7, relay contact RL7/1 closes and energises SV8 which operates the right hand lazy tong and removes the sack No. 8 from the acceptance plate to the stripping plate. As the sack No. 8 is removed from the acceptance plate switch PS6 is operated and pulses the selector switch to position No. 29 via line, selector switch contact No. 20, switch PS6, to rectifier No. 4 which energises selector switch solenoid. In position No. 29 selector contact No. 2 closes and connects neutral line to relay RL9 (ineffective at this point), selector switch contact No. 4 remains closed (energising motor No. 6), selector switch contact No. 8 opens and de-energises relay RL7 which in turn de-energises SV8 and returns the right hand lazy tong to the acceptance plate position, selector switch contact No. 12 remains closed (energising SV7), selector switch contact No. 16 closes and connects supply to switches PS2 and PS5 (ineffective at this point).

Sack No. 9 continues around the semicircular conveyor and operates LS4 which energises relay RL9 via line, switch LS4 through coil RL9 and selector switch contact No. 2, the relay RL9 is then maintained via relay contact RL9/2 through coil RL9 and selector switch contact No. 2, relay contact RL9/1 closes and connects supply to rectifier No. 5 which in turn energises relay RL11, relay contact RL11/1 closes and energises SV4 which operates the cross ram and removes sack No. 9 from the semicircular conveyor to acceptance plate. As the sack No. 9 is removed from the semicircular conveyor switch PS5 is operated and pulses the selector switch to position No. 30 via line, selector switch contact No. 16, switch PS5 to rectifier No. 4 which energises the selector switch solenoid. In position No. 30 selector switch contact No. 2 opens and de-energises relay RL9 which in turn de-energises SV4 and returns the cross ram to the semicircular conveyor position; selector switch contact No. 6 closes and energises SV1 and lifts the main gate to allow bag No. 10 to pass through, selector switch contact No. 12 remains closed (energising SV7), selector switch contact No. 15 closes and connects the supply to switch PS1 (ineffective at this point).

As sack No. 10 passes around the semicircular conveyor switch PS1 is operated and pulses the selector switch to position No. 31 via line, selector switch contact No. 15, switch PS1 to rectifier No. 4 which energises the selector switch solenoid. In position No. 31 selector switch contact No. 4 remains closed (energising motor No. 6), selector switch contact No. 6 opens and de-energises SV1 which drops the main gate, selector switch contact No. 12 remains closed (energising SV7), selector switch contact No. 20 closes and connects supply to switch PS6 (ineffective at this point), selector switch contact No. 8 closes and energises relay RL7, relay contact RL7/1 closes and energises SV8 which operates the right hand lazy tong and removes sack No. 9 from the acceptance plate to the stripping plate. As the sack No. 9 is removed from the acceptance plate switch No. PS6 is operated and pulses the selector switch to position No. 32.

In position No. 32 selector switch contact No. 2 closes and connects neutral line to relay RL9 (ineffective at this point), selector switch contact No. 4 opens and stops the motor operating the belt on gate 24, selector switch contact No. 8 opens and de-energises relay RL7 which in turn de-energises SV8 which returns the right hand lazy tong to the acceptance plate position, selector switch contact No. 12 remains closed (energising SV7), selector switch contact No. 16 closes and connects supply to switches PS2 and PS5 (ineffective at this point). Sack No. 10 continues around the semicircular conveyor and operates switch LS4 which energises relay RL9 via line, switch LS4 through coil RL9 and selector switch contact No. 2, relay RL9 is then maintained via relay contact RL9/2 through coil RL9 and selector switch contact No. 2, relay contact RL9/1 connects supply to rectifier No. 5 which in turn energises relay RL11, relay contact RL11 closes and energises SV4 which operates the cross ram and removes sack No. 10 from the semicircular conveyor to the acceptance plate.

As the sack No. 10 is removed from the semicircular conveyor switch PS5 is operated and pulses the selector switch to position No. 33 via line, selector switch contact No. 16, switch PS5 to rectifier No. 4 which energises the selector switch solenoid. In position No. 33 selector switch contact No. 2 opens and de-energises relay RL9 which in turn de-energises SV4 which returns the cross ram to the semicircular conveyor position, selector switch contact No. 12 remains closed (energising SV7), selector switch contact No. 20 closes and connects supply to PS6 (ineffective at this point), selector switch contact No. 8 closes and energises relay RL7, relay contact RL7/1 energises SV8 and operates the right hand lazy tong and removes sack No. 10 from the acceptance plate to the stripping plate. As the sack No. 10 is removed from the acceptance plate switch PS6 is operated and selector switch is pulsed to position No. 34 via line, selector switch contact No. 20, switch PS6 to rectifier No. 4 which energises selector switch solenoid. In position No. 34 selector switch contact No. 8 opens and de-energises relay RL7 which in turn de-energises SV8 and returns the right hand lazy tong to the acceptance plate position, selector switch contact No. 12 opens and de-energises SV7 which raises the cross ram stop plate, selector switch contact No. 22 closes and connects supply to switch contact LSP4C (ineffective at this point), selector switch contact No. 5 closes and energises relay RL10, relay contact RL10/1 closes and energises the motor No. 7 forward contactor via L1 (CTR2), O/L contact, relay contact RL10/1, switch contact LSP4D through coil F to L2 (CTR2), the forward contactor is then maintained by contact F (connected across relay contact RL10/1), the stripping plate moves forward.

When the stripping plate is in the fully forward position switch LSP4 is operated, switch contact LSP4D opens and de-energises the stripping plate forward contactor, switch contact LSP4B closes and energises relay RL4 direct, relay contact RL4 closes and energises SV10 (relay RL4 and SV10 are then maintained via line, relay contact RL4 and switch contact LSP2B), with SV10 energised the stripping bar rams are operated and the stripping bar is pulled down, switch contact LSP4A closes and energises relay RL3 from rectifier No. 2, relay contact No. RL3 closes and energises the stripping plate reverse contactor via L1 (CTR2), O/L contact, relay contact RL3, switch contact LSP2A, through coil R to L2 (CTR2), the reverse contactor is then self maintained L1 (CTR2), O/L contact, contact R, switch contact LSP2A through coil R to L2 (CTR2), switch contact No. LSP4C closes and pulses the selector switch to position No. 35 via line, selector switch contact No. 22, switch contact LSP4C to rectifier No. 4 which energises the selector switch solenoid. The stripping plate reverses and the sacks are transferred from the stripping plate to the pallet.

In position No. 35 selector switch contact No. 5 opens and de-energises relay RL10 (ineffective at this point), selector switch contact No. 22 opens and disconnects supply to switch contact LSP4C (ineffective at this point), selector switch contact No. 21 closes and connects supply to switch contact LSP3A (ineffective at this point). As the stripping plate is reversing switch LSP3 is operated, switch contact LSP3B closes and operates motor No. 4 lower contactor via L1 (CTR3), O/L contact, link, switch contact LSP3B through coil L, normally closed contact on raise contactor, relay contact RL12/1, switch contact LSS2, switch contact LS6B to L3 (CTR3), the lower contactor is then maintained by contact X (connected across switch contact LSP3B), lift starts lowering, switch contact LSP3A closes and pulses the selector switch to position No. 36 via line, selector switch contact No. 21, switch contact LSP3A to rectifier No. 4 which energises the selector switch solenoid. In position No. 36 selector switch contact No. 18 closes and connects supply to switch contact LSP2C (ineffective at this point). The stripping plate continues to reverse to the original position and operates switch LSP2, switch LSP2A opens and stops the reverse contactor (stripping plate stops), switch contact LSP2B opens and de-energises SV10 which raises the stripping bar.

As the sacks are being removed from the stripping plate to the pallet the light source from the photo-electric cell is interrupted and relay RL12 is de-energised, when the lift has lowered to a point where the light source is completed relay RL12 is energised, relay contact RL12/1 opens and de-energises the lift lower contactor, lift stops. When the switch LSP2 is operated switch contact LSP2C pulses the selector switch to position No. 1 via line, selector switch contact No. 18; switch contact LSP2C to rectifier No. 4 which energises the selector switch solenoid. The selector switch is now ready for the next sequence.

One complete rotation of the selector switch controls the feeding and transference of two layers of sacks. Four complete rotations completes a pallet of eight layers. When the eight layers are loaded on the pallet and the lift is descending switch LS5 is operated (switch LS5 is operated for the lower 1 foot travel of the lift), switch contact LS5A opens and deenergises delay relay RL5, switch contact LS5C opens and deenergises the contactors for motors Nos. 1 and 2, straight and curved conveyor motors stop, switch contact LS5B closes and energises SV11 which operates the pallet clamp and releases the pallet. When the lift is in the fully lowered position switch LS6 is operated, switch contact LS6B opens and de-energises the lower lift contactor (lift stops), switch contact LS6A closes and energises relay RL1 from rectifier No. 1, capacitor, switch contact LS6A to relay coil RL1, relay contact RL1 will close and energise the pallet dispenser forward contactor via L1 (CTR1), O/L contact, relay contact RL1, switch LS3B to L2 (CTR1), the forward contactor is then maintained via L1 (CTR1), O/L contact, maintaining contact, switch LS3B through coil F to L2 (CTR1). The pallet dispenser is now driving an empty pallet on to the lift and at the same time pushing the fully loaded pallet to the powered run off conveyor. As the fully loaded pallet is pushed to the run off conveyor, switch LS7 is operated and energises motor 5 contactor direct which starts the run off conveyor motor and the loaded pallet is driven on to the run off conveyer. (Note.—Motor No. 5 contactor is only energised whilst the pallet is in contact with switch LS7, therefore as soon as pallet clears switch LS7 motor No. 5 stops.) When the empty pallet is in the forward position (on lift) switch LS3 is operated, switch contact LS3B opens and de-energises the pallet dispenser forward contactor, switch contact LS3A closes and energises relay RL2, relay contact RL2 closes and energises the reverse contactor via L1 (CTR1), O/L contact, relay contact RL2, switch contact LS1, through coil R to L2 (CTR1), the reverse contactor is then maintained via L1 (CTR1), O/L contact, maintaining contact, switch contact LS1, through coil R to L2 (CTR1). As the pallet dispenser is reversing switch LS2 is operated and energises the lift raise contactor via L1 (CTR3), O&L contact, link, switch contact LS2 through coil R, normally closed contact on lower contactor, switch contact LSS1, switch contact LSP1B to L3 (CTR3), the raise contactor is then maintained by the maintaining contact connected across switch contact LS2. When the pallet dispenser is in the reversed position switch LS1 is operated and stops the reverse contactor. The lift continues to rise and the sequence starts again for second pallet loading.

The rigid plate on which the containers are assembled and from which they are transferred to the pallet is preferably made of steel of about one inch thickness. Other materials may be used provided they are strong enough to carry a layer of containers which may weigh for example about 300 pounds. The plate can be supported in cantilever fashion when fully forward, but we prefer to cause the plate to be supported along its two sides in the direction of movement for at least the greater part of its length of travel. This may be done for example by providing the plate with wheels along its two sides to run on rails. Such wheels are preferably mounted on the underside of the plate so that the feeding of containers from any side is not interfered with.

We also prefer that the upper surface of the plate should be smooth to allow the containers to be transferred easily and without damage from the plate to the pallet. Metal plates can be polished or alternatively they can be provided with a smooth surface covering that is resistant to wear by the sliding of objects across it e.g. by the application of a lacquer or an enamel or by the attachment of a thin layer of a material having a hard smooth surface e.g. polyvinyl chloride foil, or a substrate impregnated or coated with a synthetic resin e.g. a formaldehyde condensation resin. In order to get well stacked layers of containers, particularly filled sacks, on the pallet it is desirable that the distance through which the container must drop from the plate surface to the pallet should be as small as possible. In practice, by using sensitive photocells, e.g. operated by flat beams of light, it is possible to operate our apparatus with a clearance of about one inch between the bottom of the plate and the highest point of the pallet load. In order to transfer containers from the plate to the pallet as gently as possible we prefer that the upper surface of the plate along the edge over which containers are transferred to the pallet should be bevelled, preferably with a curved profile. Alternatively, the stripping edge of the plate can be in the form of a hinged flap thinner than the plate and normally held horizontal in line with the upper surface of the plate by means of a spring. Such a hinged flap can also be provided with a stop if necessary to limit its downward movement.

The means for feeding the containers may take any suitable form e.g. moving belts or roller conveyors may be used. Where it is necessary to move a conveyor round a bend it is sometimes desirable to use a power operated moving side wall to eliminate the possibility of dead spots in the conveyor system. Two separate conveying systems that feed containers to the plate in directions at right angles to each other may be used with the feed from each controlled by the automatic controlling means. We prefer however to use a single main feed conveyor that divides in its path into two conveyors feeding the plate in two directions at right angles, the conveyor at the point of division being provided with a gate that is operated by the automatic controlling means to close one or other of the two conveyors.

It will be appreciated that the assembly of the containers on the plate can be effected in many different ways once the means have been provided of feeding the containers in two directions at right angles to each other. The containers may be fed directly from the conveyors on to the plate, or they may be fed to an assembly area and then transferred to the plate by the pushing or pulling means. A conveyor feeding containers in one of the two said directions may be further divided into two parallel conveyors as described in our first embodiment, to allow containers to be fed to the plate or assembly area in their appropriate directions without having to be pulled or pushed sideways for any particular packing arrangement. Alternatively, the containers may be fed from conveyors in each of the two directions, and then pulled or pushed into their positions on the plate by pushing or pulling means acting in the same two directions at right angles as required.

The pulling or pushing means is preferably operated by fluid pressure, e.g. pneumatically, and is preferably in the form of a vertical plate mounted on an arm to pull or push the container into position on to the plate. We prefer that the vertical plate should be hinged and adapted to be held vertical to position a container on one stroke and then allowed to pivot on the hinge on the return stroke so that it rides over any container that may be in its path.

The stopping means is preferably a bar under which the plate can move. The position of the bar will depend upon the method by which it is desired to move the plate and strip off the layer of containers. At the start of the stripping operation the bar will be in a position over the plate remote from the stripping edge and it may be necessary to have means to raise or lower the bar according to the position of the plate during loading. Thus, if the plate is held over the pallet while it is being loaded with containers, the stopping means should be positioned at the end of the plate remote from the stripping edge. If, on the other hand, the plate is first loaded and then moved forward over the pallet the stopping means should be positioned over the stripping edge in the plate loading position, and it should be capable of being lifted and lowered so that it is in the raised position when the plate is moved forward to allow the containers to move under the stopping means, and in the lower position when the plate is forward so that the containers are stripped as the plate is withdrawn. The method in which the plate is moved forward from its loading position to a position over the pallet before stripping, has the advantage that when the plate has been stripped, loading of another layer on to the plate can proceed while the pallet holder is being lowered to its new position, with a consequential saving in time.

The pallet holder can be moved vertically by any convenient means e.g. by a ram operated hydraulically, or by means of lead screws. The use of lead screws is particularly convenient since the lifting apparatus is self-contained and occupies less space than a hydraulically operated lift would normally need. The use of lead screws allows the operation of the lift to be accurately controlled so that the minimum space is left between the topmost part of the pallet load and the lower side of the plate. The pallet holder is preferably equipped with a clamping device to ensure that the pallet is not disturbed from its position on the holder during the stripping of containers from the plate.

The operation of the apparatus is preferably controlled by electrical means e.g. by means of relays operated by limit switches that are operated by the plate, bar, pushing or pulling means and other moving parts of the apparatus. By using an electrical control of this kind it is possible for any of the packing combinations to be changed easily and quickly. This may be effected as illustrated in our second embodiments described herein by the provision of interchangeable rotating cams that control the switching of the relays controlling the feed conveyors. It will be appreciated that the overall automatic operation of our apparatus may be effected by a single controlling device e.g. a rotary selector switch as hereinafter described.

The controlling means that enables our apparatus to operate automatically to feed single layers of containers to the plate in a sequence of one of at least two packing combinations followed by the other or another of the packing combinations, preferably comprises a switching device that controls the feeding of containers from the two feeding directions and which is actuated by means operated by the passage of containers in the feeding means to cause feeding of containers from one direction to cease when a pre-determined number of containers has been fed from that direction and thereafter to cause a pre-determined number of containers to be fed from the other feeding direction. The means operated by passage of the container is preferably a circuit incorporating a photosensitive device arranged so that passage of a container interrupts the beam directed on to the photosensitive device and thereby operates the switching device. The switching device can be controlled by other means, e.g. by contact switches or by pneumatically operated switches. The switching device is preferably a device that occupies a plurality of positions in sequence and which is caused to move from one position to the next as each container is fed from the feeding means, particular positions among the plurality of positions being adapted to control the operation of the feeding means. A suitable switching device is for example a stepping relay which when it is moved into the appropriate position by the means operated by passage of the containers causes the means feeding containers in one direction to cease and the means feeding containers in the other direction to start.

A preferred form of switching device is a rotary selector switch comprising a plurality of cams mounted on a rotatable arm with each cam controlling a switch. The arm is caused to rotate by an electric pulse operated solenoid acting on a pawl and ratchet. The pulses operating the solenoid can be made to come from any part of the apparatus where there is movement e.g. from the passage of containers along the conveyor and from the various limit switches operated e.g. by the pushing or pulling means, the plate, and the pallet holder lift. The switches operated by the cams can form part of the circuit controlling the apparatus so that the whole sequence of operations can be controlled by the arrangement of the cams. By changing the arrangement of the cams or by replacing one rotatable arm with another arm having differently arranged cams it is easily possible to alter the sequence of operations so that one set of packing combinations are replaced by a different set of packing combinations. By having as many rotatable arms with cams arranged for all desired packing combinations it is possible to change from one packing combination to another very quickly.

Our apparatus is easily adapted to many packing combinations. It can also be used for the simultaneous packing of two different sets of products using the same or different packing combinations without the need for extensive conveyor feed systems. This can be achieved for example by having two pallet holders fed from a single plate which is twice the size required for a single pallet holder. The two pallet holders are separated by half the stripping plate length and the stripping plate is adapted to shuttle between the two pallet holders so that when moved in one direction one half of the stripping plate covers one pallet holder and the other half covers the space between the two pallet holders, and when moved in the other direction the half previously over the open space covers the other pallet holder and the other half is over the open space. In order to feed containers containing different products to the plate for separate stacking on two different pallets two conveyors are provided which are capable of carrying enough containers for one pallet layer, and the two conveyors join together to form a single conveyor from which containers are fed to the stripping plate by the methods hereinbefore described. A gate is provided at the point of junction of the two initial conveyors so that only one initial conveyor can feed containers to the single conveyor.

Operation of this appartaus is illustrated by reference to the attached FIGURE 8 which illustrates a schematic plan of the apparatus. The two initial conveyors 56 and 57 join to form the single conveyor 55 with a gate at the point of junction. The pallet holders with pallets are shown at 52 and 53 and the plate is shown by the shaded area 51.

Figure 8A:
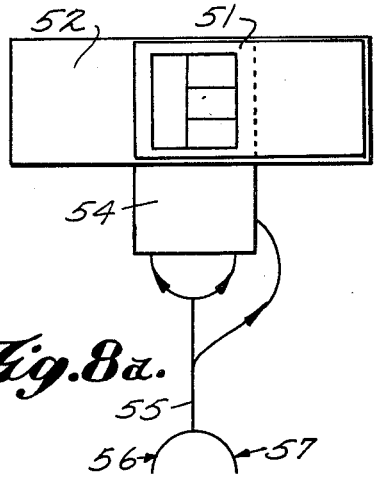
Figure 8B:
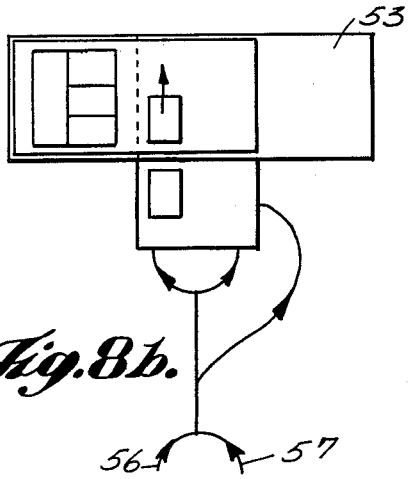
Figure 8C:
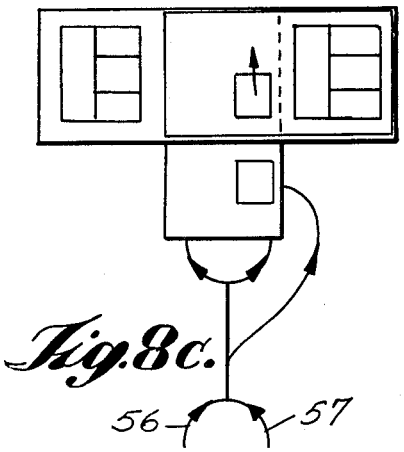
Figure 8D:
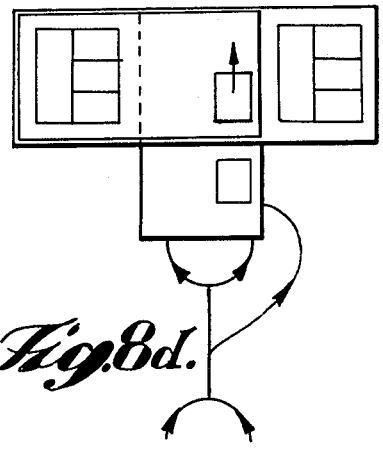

The selector mechanism is arranged so that five containers are fed from conveyor 56 to the assembly area 54 and from there to form the layer on the plate 51 as shown in FIGURE 8(a). The plate then moves to the left as in FIGURE 8(b) and loading from conveyor 57 then starts. When this layer is complete the plate is moved to the right, stripping the layer on to the pallet on holder 52. Loading from conveyor 56 then starts as in FIGURE 8(c). When a layer of five containers has been loaded on to the plate stripping of the layer on the right hand side is effected and loading from conveyor 57 starts as in FIGURE 8(d).

In this apparatus each movement of the plate is a working stroke which thus facilitates high speed operation, enabling two dissimilar grades or kinds of material to be stacked simultaneously without mixing and without the need for long storage conveyors.

It may under certain circumstances be an advantage to carry out the stacking operations under conditions which prevent the spread of dust or fumes from the packed material. This can easily be accomplished by providing a hood over the apparatus with if necessary extractor fans.

It will be appreciated that by providing apparatus comprising the combination of two feeding means positioned to feed containers in two directions at right angles to a plate that can be moved under a bar so that any containers on the plate are swept by the bar on to a pallet beneath the plate, we have shown how containers can be packed on to pallets in a completely automatic manner. From this knowledge and consideration of the detailed embodiments described hereinbefore, it is possible for the skilled worker to construct other embodiments incorporating our invention.

We claim:

1. Apparatus for stacking generally rectangular containers on pallets in layers having predetermined patterns comprising: a feed conveyor dividing into two paths; a grouping station communicating with said paths; one of said paths feeding the containers to said grouping station at right angles to the other path; means operative at the juncture of said feed conveyor and said paths for selectively deflecting the containers carried thereby to each of said paths in a predetermined sequence responsive to the number of containers fed thereto; a stripper plate defining a horizontal platform aligned with said grouping station, said stripper plate being horizontally movable in transverse relationship to said grouping station; urging means for aligning at least five of said containers fed to said grouping stations in sequentially alternating layers, the consecutively formed layers being operative for interlocking relationship when stacked upon one another, said urging means being operative to transfer the containers to said stripper plate; a vertically movable pallet loading station positioned in the transverse path of movement of said horizontal platform, and operative to receive a container layer when said platform is positioned thereover, and means for stripping the container layer from said stripper plate onto said pallet loading station when said stripper plate is moved transversely back to its position adjacent said grouping station.

2. Apparatus for packing generally rectangular containers on pallets comprising: a grouping station; a stripper plate defining a horizontal platform and having a first position adjacent said grouping station; a feed conveyor; first conveyor means communicating with said feed conveyor for feeding the rectangular containers to said grouping station; second conveyor means communicating with said feed conveyor having separate parallel feeding paths for selectively feeding the rectangular containers to said grouping station substantially perpendicular to the containers from said first conveyor means; urging means for positively positioning the containers from said first conveyor means in one of two transversely selected positions at said grouping station and operative for movement in generally parallel relationship with respect to said second conveyor means for positively urging containers from said grouping station onto said stripper plate; a pallet loading station; means for moving said stripper plate from said first position to a second position over said pallet loading station; and means cooperatively positioned with respect to said stripper plate and said pallet loading station for maintaining the layer of containers above said pallet loading station when said stripper plate is moved back to said first position from said second position.

3. Apparatus defined in claim 2 wherein said urging means includes first means movable across said grouping station in alignment with said first conveyor means adjacent thereto to move containers to one of two selective transverse positions at said grouping station, and second and third means parallel to one another and to said second conveyor means, said second and third means movable in a path perpendicular to said first means to move containers from said grouping station onto said stripper plate.

4. Apparatus for stacking non-cubical containers on pallets comprising: a stripper plate having a straight edge and defining a horizontal platform for supporting a layer of containers; means for moving said plate in a substantially horizontal direction at right angles to said straight edge; means for feeding containers in a horizontal direction normal to said stripper plate edge; means for feeding containers in a direction parallel to said plate edge; and urging means movable in at least one of the directions in which the containers are fed to position containers fed from said container feeding means onto said stripper plate, said urging means including a substantially vertical plate constructed and arranged to iarry with it a container lying before it upon movement in one direction and to ride over any container lying before it upon movement in the opposite direction; pallet loading means transversely adjacent said stripper plate and movable in a vertical direction; said stripper plate being movable to position said edge above a pallet on said pallet loading means from one side to a position past the opposite side of the pallet; means for raising and lowering said pallet loading means; stripping means parallel to said stripper plate edge and operative to prevent relative horizontal movement of containers with respect to said stripper plate when said stripper plate is carrying a layer oa containers and is moved from a position over a pallet on said pallet loading means; said apparatus further including control means cooperative with said feeding means and said urging means to feed and position at least five non-cubical containers in a layer on said stripper plate wherein at least two of said containers lie head-to-head and at least two of the remaining containers lie side-by-side, said controlling means being operative when said layer has been transferred from said stripper plate to a pallet for feeding and positioning a further layer on said plate similar to said first-mentioned layer but wherein said container in said subsequent layer lies on parts of at least two containers in the layer below.

5. Apparatus according to claim 4 in which said plate is attached to an arm by means of a hinge so that said plate can pivot about the horizontal axis along its upper edge in one direction from the vertical but not the other direction.

6. Apparatus for stacking non-cubical containers on pallets comprising: a stripper plate having a straight edge and defining a horizontal platform for supporting a layer of containers; means for moving said plate in a substantially horizontal direction at right angles to said straight edge; means for feeding containers in a horizontal direction normal to said stripper plate edge; means for feeding containers in a direction parallel to said plate edge; and urging means movable in at least one of the directions in which the containers are fed to position containers fed from said container feeding means onto said stripper plate; means actuated by fluid pressure for moving said urging means; pallet loading means transversely adjacent said stripper plate and movable in a vertical direction; said stripper plate being movable to position said edge above a pallet on said pallet loading means from one side to a position past the opposite side of the pallet; means for raising and lowering said pallet loading means; stripping means parallel to said stripper plate edge and operative to prevent relative horizontal movement of containers with respect to said stripper plate when said stripper plate is carrying a layer of containers and is moved from a position over a pallet on said pallet loading means; said apparatus further including control means cooperative with said feeding means and said urging means to feed and position at least five non-cubical containers in a layer on said stripper plate wherein at least two of said containers lie head-to-head and at least two of the remaining containers lie side-by-side, said controlling means being operative when said layer has been transferred from said stripper plate to a pallet for feeding and positioning a further layer on said plate similar to said first-mentioned layer but wherein each container in said subsequent layer lies on parts of at least two containers in the layer below.

7. Apparatus for stacking non-cubical containers on pallets comprising: a stripper plate having a straight edge and defining a horizontal platform for supporting a layer of containers; means for moving said plate in a substantially horizontal direction at right angles to said straight edge; means for feeding containers in a horizontal direction normal to said stripper plate edge; means for feeding containers in a direction parallel to said plate edge; and urging means movable in at least one of the directions in which the containers are fed to position containers fed from said container feeding means onto said stripper plate; pallet loading means transversely adjacent said stripper plate and movable in a vertical direction; said stripper plate being movable to position said edge above a pallet on said pallet loading means from one side to a position past the opposite side of the pallet; means for raising and lowering said pallet loading means; stripping means parallel to said stripper plate edge and operative to prevent relative horizontal movement of containers with respect to said stripper plate when said stripper plate is carrying a layer of containers and is moved from a position over a pallet on said pallet loading means, including a vertical face substantially in line with said edge when said stripper plate is in the position for loading; means for raising said stripping means when said stripper plate is moved from the loading position to the position over said pallet loading means and thereafter to lower said stripping means before said stripper plate is moved back to its loading position; said apparatus further including control means cooperative with said feeding means and said urging means to feed and position at least five non-cubical containers in a layer on said stripper plate wherein at least two of said containers lie head-to-head and at least two of the remaining containers lie side-by-side, said controlling means being operative when said layer has been transferred from said stripper plate to a pallet for feeding and positioning a further layer on said plate similar to said first-mentioned layer but wherein said container in said subsequent layer lies on parts of at least two containers in the layer below.

References Cited in the file of this patent

UNITED STATES PATENTS

| | | |
|---|---|---|
| 1,399,528 | Sommers | Dec. 6, 1921 |
| 2,655,271 | Cole et al. | Oct. 13, 1953 |
| 2,699,264 | Bruce | Jan. 11, 1955 |
| 2,813,638 | Miller | Nov. 19, 1957 |
| 2,883,074 | Boehl et al. | Apr. 21, 1959 |
| 2,901,096 | Burrows | Aug. 25, 1959 |
| 2,947,405 | Fenton | Aug. 2, 1960 |
| 2,971,659 | Miller | Feb. 14, 1961 |
| 3,007,585 | Geisler | Nov. 7, 1961 |

FOREIGN PATENTS

| | | |
|---|---|---|
| 564,933 | Belgium | Mar. 15, 1958 |
| 829,795 | Great Britain | Mar. 9, 1960 |
| 848,804 | Great Britain | Sept. 21, 1960 |